United States Patent
Dal Mutto et al.

(10) Patent No.: US 10,805,535 B2
(45) Date of Patent: Oct. 13, 2020

(54) SYSTEMS AND METHODS FOR MULTI-CAMERA PLACEMENT

(71) Applicant: AQUIFI, INC., Palo Alto, CA (US)

(72) Inventors: Carlo Dal Mutto, Sunnyvale, CA (US); Giulio Marin, Sunnyvale, CA (US)

(73) Assignee: AQUIFI, INC., Palo Alto, CA (US)

( * ) Notice: Subject to any disclaimer, the term of this patent is extended or adjusted under 35 U.S.C. 154(b) by 0 days.

(21) Appl. No.: 16/422,829

(22) Filed: May 24, 2019

(65) Prior Publication Data
US 2019/0364206 A1 Nov. 28, 2019

Related U.S. Application Data

(60) Provisional application No. 62/676,799, filed on May 25, 2018.

(51) Int. Cl.
*H04N 5/232* (2006.01)
*G06T 7/73* (2017.01)
*G06T 7/80* (2017.01)

(52) U.S. Cl.
CPC ........... *H04N 5/23238* (2013.01); *G06T 7/73* (2017.01); *G06T 7/85* (2017.01)

(58) Field of Classification Search
CPC .................................................. H04N 5/23238
See application file for complete search history.

(56) References Cited

U.S. PATENT DOCUMENTS

| 6,959,253 | B2 | 10/2005 | Jackson et al. |
| 8,457,357 | B2 | 6/2013 | Foote et al. |
| 8,897,543 | B1* | 11/2014 | Lin .................. G06K 9/46 382/154 |
| 9,688,200 | B2 | 6/2017 | Knudsen |
| 9,928,595 | B2* | 3/2018 | Martinello ............. G06T 7/80 |
| 2016/0071272 | A1 | 3/2016 | Gordon |

OTHER PUBLICATIONS

International Search Report and Written Opinion for International Application No. PCT/US19/34059, dated Sep. 17, 2019, 7 pages.

\* cited by examiner

*Primary Examiner* — Jefferey F Harold
*Assistant Examiner* — Humam M Satti
(74) *Attorney, Agent, or Firm* — Lewis Roca Rothgerber Christie LLP

(57) ABSTRACT

A method for calibrating a camera group includes: controlling a first and second cameras to capture first and second images of a first scene, the first camera having a first field of view (FOV), the second camera having a second FOV overlapping the first FOV in a first overlap region; the first scene including a calibration target in the first overlap region; computing a first relative pose based on the first and second images; controlling the second camera and a third camera to capture third and fourth images of a second scene, the third camera having a third FOV overlapping the second FOV in a second overlap region, the second scene including a calibration target in the second overlap region; computing a second relative pose based on the third and fourth images; and computing a third relative pose based on the first and second relative poses.

19 Claims, 12 Drawing Sheets

SYSTEMS AND METHODS FOR MULTI-CAMERA PLACEMENT

CROSS-REFERENCE TO RELATED APPLICATION(S)

This application claims the benefit of U.S. Provisional Patent Application No. 62/676,799, filed in the United States Patent and Trademark Office on May 25, 2018, the entire disclosure of which is incorporated by reference herein.

FIELD

Aspects of embodiments of the present invention relate to systems and methods for placing and calibrating multiple cameras.

BACKGROUND

Camera calibration or camera resectioning is the process of estimating the parameters of a pinhole camera model that approximates a particular real-world camera. The parameters include: intrinsic parameters such as focal length, image aspect ratio (e.g., image sensor format), and principal point; distortion parameters relating to radial factors (e.g., barrel and fish-eye effects) and tangential factors (e.g., due to misalignment between the lens and the image sensor); and extrinsic parameters which denote coordinate system transformations between three-dimensional (3-D) world coordinates and 3-D camera coordinates. The extrinsic parameters represent the 3-D "pose" of the camera, which includes the position and orientation of the camera in the 3-D world.

In image stitching and stereo imaging applications, two or more images of a scene are captured from different 3-D camera poses. The two or more images may be captured by the same camera at different times by repositioning the camera between captures or may be captured by different cameras having different poses. The different cameras may capture the images either substantially simultaneously or at different times.

Algorithms that involve the use of the two or more images, such as image stitching and stereo imaging, may require that the images be aligned. Failure to align the images may result in errors or undesired visual artifacts in the outputs of such algorithms. When the camera poses corresponding to the images are known, the alignment process may involve applying transformations to the images based on the known camera poses. On the other hand, when the poses of the camera or cameras corresponding to the images are not known, pose estimation techniques may be applied in order to estimate the transformations for combining the two or more images, or the images may be manually matched by detecting and aligning features that appear in multiple images.

Similarly, in circumstances where the cameras are depth cameras (e.g., cameras that capture three-dimensional data or depth images that include three-dimensional coordinates, also referred to as point clouds), knowledge of the relative poses of the cameras enables the point clouds to be merged after applying geometric transformations in accordance with the poses. If the relative poses were not known, more computationally expensive techniques such as iterative closest point (ICP) may be needed to align the point clouds.

SUMMARY

Aspects of embodiments of the present invention relate to systems and methods for placing multiple cameras and calibrating these cameras with respect to one another, including estimating the 3-D poses of the cameras.

According to one embodiment of the present invention, a system for placing and calibrating cameras includes a first camera group including: a first camera having a first field of view; a second camera having a second field of view overlapping the first field of view in a first overlap region; a third camera having a third field of view overlapping the second field of view in a second overlap region; a controller including a processor and a memory, the memory storing instructions that, when executed by the processor, cause the processor to: control the first camera and the second camera to capture, respectively, a first image and a second image of a first scene, the first scene including a first calibration target in the first overlap region; compute a first relative pose between the first camera and the second camera based on the first calibration target in the first image and the first calibration target in the second image; control the second camera and the third camera to capture, respectively, a third image and a fourth image of a second scene, the second scene including a second calibration target in the second overlap region; compute a second relative pose between the second camera and the third camera based on the second calibration target in the third image and the second calibration target in the fourth image; compute a third relative pose between the first camera and the third camera based on the first relative pose and the second relative pose; and compute a first calibration of the first camera group based on the first relative pose, the second relative pose, and the third relative pose.

The first camera group may further include a fourth camera having a fourth field of view overlapping the third field of view in a third overlap region, and the memory may further store instructions that, when executed by the processor, cause the processor to: control the third camera and the fourth camera to capture, respectively, a fifth image and a sixth image of a third scene, the third scene including a third calibration target in the third overlap region; and compute a fourth relative pose between the third camera and the fourth camera.

The memory may further store a plurality of designed poses of the cameras of the first camera group, and the memory may further store instructions that, when executed by the processor, cause the processor to: compute a plurality of differences between the designed poses and the first relative pose, the second relative pose, and the third relative pose; and output the plurality of differences.

Each of the cameras may include one or more light emitting diodes, and the memory may further store instructions that, when executed by the processor, cause the processor to: control the light emitting diodes of the cameras to indicate the plurality of differences between the first relative pose, the second relative pose, and the third relative pose and the designed poses.

The system may further include a graphical user interface displayed on a display device, and the memory may further store instructions that, when executed by the processor, cause the processor to: display, on the display device, an indication of the plurality of differences between the first relative pose, the second relative pose, and the third relative pose and the designed poses.

The memory may further store instructions that, when executed by the processor, cause the processor to: display, on the display device, a first confidence for the first relative pose, a second confidence for the second relative pose, and a third confidence for the third relative pose.

Each of the cameras may include: a first two-dimensional camera having a first optical axis; and a second two-dimensional camera having a second optical axis substantially parallel to the first optical axis and having a field of view overlapping a field of view of the first two-dimensional camera.

The first calibration target may include a backlit calibration target including a plurality of light emitting diodes configured to emit light through a calibration pattern.

The second calibration target may be the first calibration target after performing a rigid transformation.

The first camera group may be configured to image objects conveyed by a first portion of a conveyor system, the first calibration target may be conveyed by the conveyor system, and the system may further include: a second camera group including a second plurality of cameras, the second camera group being configured to image objects conveyed by a second portion of the conveyor system; a coordinating server configured to receive data captured by the first camera group and the second camera group, the coordinating server including a processor and a memory storing instructions that, when executed by the processor, cause the processor to: control the first camera group to compute the first calibration, when the first calibration target is in the first portion of the conveyor system; control the second camera group to compute a second calibration based on relative poses of the second plurality of cameras after the first calibration target is conveyed by the conveyor system to the second portion of the conveyor system; and compute a calibration of the first camera group to the second camera group based on the first calibration and the second calibration.

According to one embodiment of the present invention, a method for placing and calibrating cameras of a first camera group includes: controlling a first camera and a second camera of the first camera group to capture, respectively, a first image and a second image of a first scene, the first camera having a first field of view, the second camera having a second field of view overlapping the first field of view in a first overlap region; the first scene including a first calibration target in the first overlap region; computing a first relative pose between the first camera and the second camera based on the first calibration target in the first image and the first calibration target in the second image; controlling the second camera and a third camera of the first camera group to capture, respectively, a third image and a fourth image of a second scene, the third camera having a third field of view overlapping the second field of view in a second overlap region, the second scene including a second calibration target in the second overlap region; computing a second relative pose between the second camera and the third camera based on the second calibration target in the third image and the second calibration target in the fourth image; computing a third relative pose between the first camera and the third camera based on the first relative pose and the second relative pose; and computing a first calibration of the first camera group based on the first relative pose, the second relative pose, and the third relative pose.

The first camera group may further include a fourth camera having a fourth field of view overlapping the third field of view in a third overlap region, and the method may further include: controlling the third camera and the fourth camera to capture, respectively, a fifth image and a sixth image of a third scene, the third scene including a third calibration target in the third overlap region; and computing a fourth relative pose between the third camera and the fourth camera.

The method may further include: computing a plurality of differences between the first relative pose, the second relative pose, and the third relative pose and a plurality of designed poses of the cameras of the first camera group; and output the plurality of differences.

Each of the cameras may include one or more light emitting diodes, and the method may further include: controlling the light emitting diodes of the cameras to indicate the plurality of differences between the first relative pose, the second relative pose, and the third relative pose and the designed poses.

The method may further include: displaying, on a graphical user interface displayed on a display device, an indication of the plurality of differences between the first relative pose, the second relative pose, and the third relative pose and the designed poses.

The method may further include: displaying, on the display device, a first confidence for the first relative pose, a second confidence for the second relative pose, and a third confidence for the third relative pose.

Each of the cameras may include: a first two-dimensional camera having a first optical axis; and a second two-dimensional camera having a second optical axis substantially parallel to the first optical axis and having a field of view overlapping a field of view of the first two-dimensional camera.

The first calibration target may include a backlit calibration target including a plurality of light emitting diodes configured to emit light through a calibration pattern.

The second calibration target may be the first calibration target after performing a rigid transformation.

The first camera group may be configured to image objects conveyed by a first portion of a conveyor system, the first calibration target may be conveyed by the conveyor system, and the method may further include: controlling the first camera group to compute the first calibration, when the first calibration target is in the first portion of the conveyor system; controlling a second camera group including a second plurality of cameras to compute a second calibration based on relative poses of the second plurality of cameras after the first calibration target is conveyed by the conveyor system to a second portion of the conveyor system, the second camera group being configured to image objects conveyed by the second portion of the conveyor system; and computing a calibration of the first camera group to the second camera group based on the first calibration and the second calibration.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

In the following detailed description, only certain exemplary embodiments of the present invention are shown and described, by way of illustration. As those skilled in the art would recognize, the invention may be embodied in many different forms and should not be construed as being limited to the embodiments set forth herein.

Figure 1A:
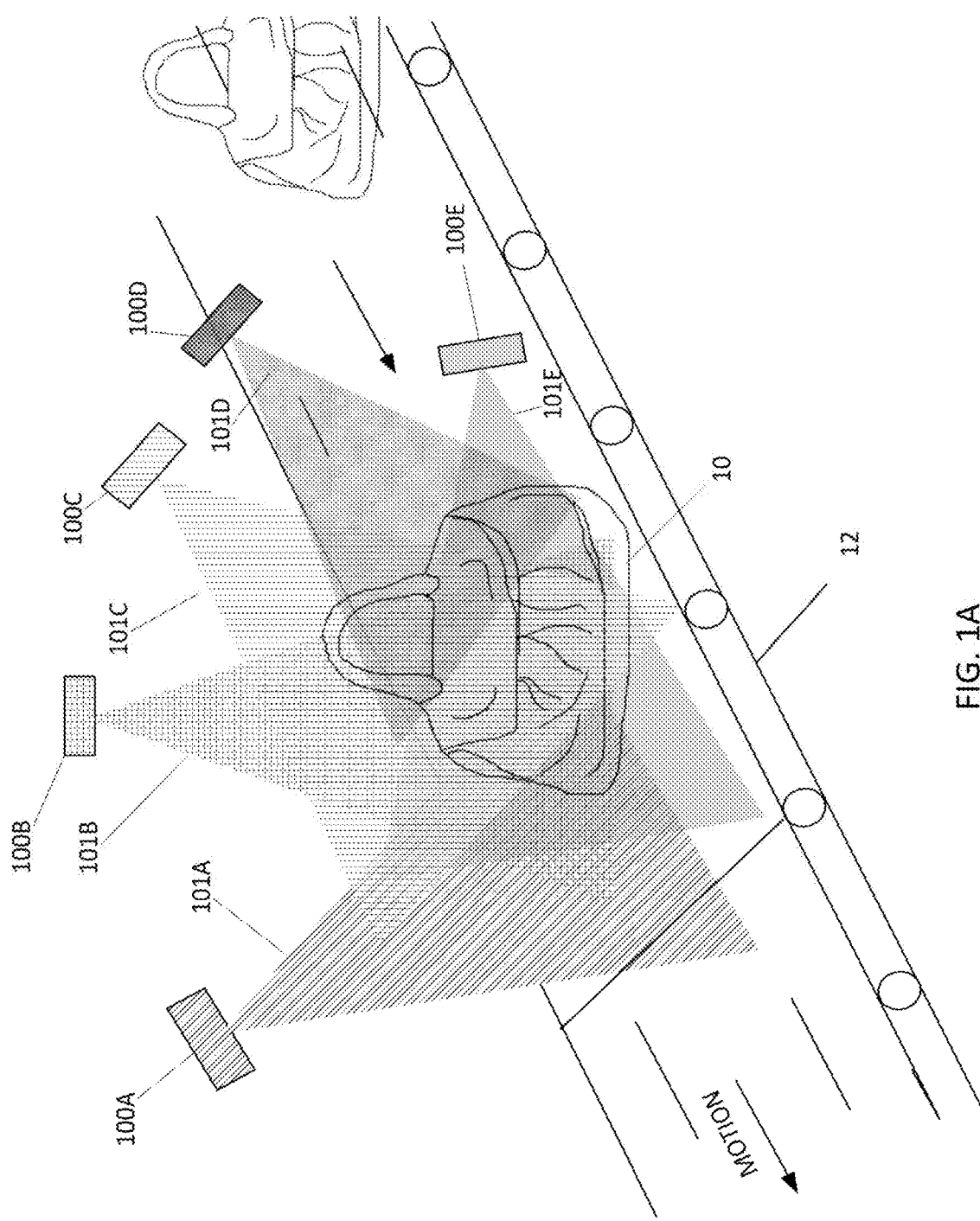
FIG. 1A is a schematic depiction of an object (depicted as a handbag) traveling on a conveyor belt with a camera group that includes a plurality of (five) cameras concurrently imaging the object according to one embodiment of the present invention.

Aspects of embodiments of the present invention relate to systems and methods for placing a group of cameras or a "camera group." In some embodiments of the present invention, the cameras of the camera group are rigidly arranged such that the field of view of each camera overlaps with the field of view of at least one other camera of the camera group (such that the cameras form a connected graph, as discussed in more detail below) and configured such that the cameras are triggered together (e.g., configured to capture images substantially simultaneously). FIG. 1A is a schematic depiction of a target object (depicted as a handbag) traveling on a conveyor belt with a camera group that includes a plurality of (five) cameras (100A, 100B, 100C, 100D, AND 100E) concurrently imaging the target object according to one embodiment of the present invention. By using multiple cameras at multiple poses relative to a target object, a camera group can capture more information about the appearance of the target object than could be captured from a camera from a single pose.

For example, camera 100A shown in FIG. 1A has a field of view 101A that captures an image of only a portion of a side of the target object 10 but does not capture information about the top of the object 10, its handle, or its other side surfaces. The addition of cameras 100B, 100C, 100D, and 100E allows the capture of additional sides and surfaces of the object 10 (as shown by the portions of the object 10 that are covered by the respective fields of view 101B, 101C, 101D, and 101E.

Figure 1B:
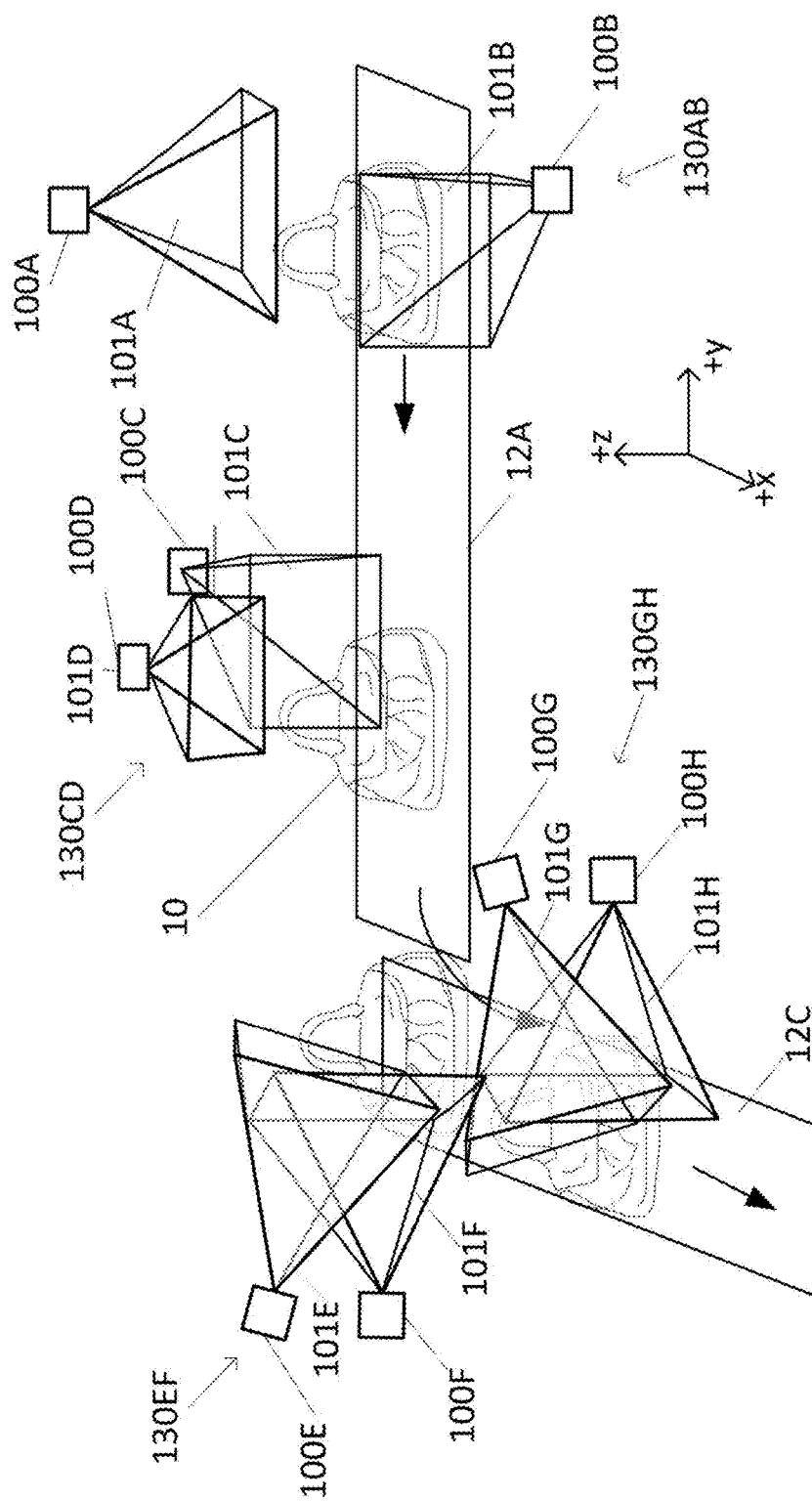
FIG. 1B is a schematic depiction of an object (depicted as a handbag) imaged by the cameras of four different camera groups as the object travels on a conveyor belt having two portions, where the first portion moves the object along a first direction and the second portion moves the object along a second direction that is orthogonal to the first direction in accordance with one embodiment of the present invention.

FIG. 1B is a schematic depiction of an object (depicted as a handbag) imaged by the cameras of four different camera groups as the object travels on a conveyor belt having two portions, where the first portion moves the object along a first direction and the second portion moves the object along a second direction that is orthogonal to the first direction in accordance with one embodiment of the present invention. FIG. 1B is a schematic depiction of objects 10 (depicted as handbags) traveling on a conveyor belt 12 having two portions, where the first portion 12a moves the objects 10 along a first direction (the −y direction) and the second portion 12b moves the object 10 along a second direction (the +x direction) that is orthogonal to the first direction in accordance with one embodiment of the present invention. When the object 10 travels along the first portion 12a of the conveyor belt 12, at a first location, a first camera 100A images the top (+z) surface of the object 10 from above, while a second camera 100B images the +x side of the object. The first camera 100A and the second camera 100B may make up a first camera group 130AB. At a second location on the first portion 12a of the conveyor belt, third and fourth cameras 100C and 100D of a second camera group 130CD image a −x side of the objects 10.

In this arrangement, it may be difficult to image the ends of the object 10 because doing so would require placing the cameras along the direction of movement of the conveyor belt and therefore may obstruct the movement of the objects 10. As such, the object 10 may transition to the second portion 12b of the conveyor belt 12, where, after the transition, the −y side of the object 10 is now visible to cameras 100E and 100F of a third camera group 130EF at a third location. At a fourth location, cameras 100G and 100H of a fourth camera group 130GH image a +y side of the object. Assuming that the cameras 100 of the camera groups 130 are substantially stationary and that the objects move along the conveyor system, each the cameras may capture multiple images of the objects as the objects pass by. As such, FIG. 1B illustrates an example of an arrangement of camera groups 130 that allows coverage of the entire visible surface of the object 10.

In some embodiments of the present invention, the data captured by the cameras of the different camera groups 130 is combined to synthesize a single 3-D model of the object (e.g., a global model of the entire object 10). In some embodiments, the data captured by each of the camera groups 130 is processed separately (e.g., to generate several separate 3-D models) without combining all of the captured data into a single "global" 3-D model. Various considerations related to the control of camera groups and coordination between multiple camera groups is described in more detail in U.S. patent application Ser. No. 16/404,590, "Systems And Methods for Three-Dimensional Data Acquisition and Processing Under Timing Constraints," filed in the United States Patent and Trademark Office on May 6, 2019, the entire disclosure of which is incorporated by reference herein.

As discussed in the background section, the problem of merging or combining the images captured by different cameras is simplified if the extrinsic parameters (e.g., relative poses) of each of the cameras is known. The process of determining these parameters may be referred to as calibrating the cameras, and the cameras of a camera group can be referred to as being "calibrated" when the extrinsic parameters (e.g., the relative poses) are known for each camera.

For the sake of convenience, it is also assumed that the intrinsic parameters and the distortion parameters of each camera are already known (although such parameters can also be refined through the use of images captured during the calibration process discussed herein).

In some circumstances, the cameras in the camera group are rigidly mounted to a support and may be designed to be arranged with a particular set of relative poses in order to capture a particular set of views of the objects that will be imaged by the camera group. However, it may be difficult to place and arrange the cameras of the camera group accurately in their designed poses during deployment. For example, imprecision and errors during the mounting of the cameras to the support may cause significant and detectable errors or artifacts in the collected data.

One technique for calibrating the cameras 100 of a camera group 130 includes placing a calibration target within the fields of view 101 of all of the cameras 100 of the camera group and controlling all of the cameras 100 to capture images of the calibration target substantially simultaneously (or otherwise capture images of the calibration target where, in each of the images, the calibration target is in the same position and orientation w with respect to an absolute coordinate system). This, in turn, allows the pose of each camera to be estimated with respect to the same calibration target and thereby also allowing the computing of the relative poses between the cameras 100 of the camera group 130. However, constraints set by the working environment (e.g., glare from existing workspace lighting or sources of infrared radiation, space and location requirements of existing equipment and personnel, etc.) may also make it difficult or impossible to place a calibration target in a position where it is simultaneously in the fields of view 101 of all of the cameras 100 of a camera group 130.

As such, some aspects of embodiments of the present invention relate to calibrating a camera group (e.g., computing extrinsic parameters of the cameras of the camera group) without requiring that all of the cameras image a calibration target in a same pose (3-D position and orientation) with respect to all of the cameras. For example, some embodiments of the present invention relate to computing relative poses of between a first camera, a second camera, and a third camera of a camera group, where a calibration target is imaged in a first pose by the first camera and the second camera (but the calibration target in the first pose is not in the field of view of the third camera), and a calibration target (e.g., the same calibration target or a different calibration target) is imaged in a second pose by the second camera and the third camera (but the calibration target in the second pose is not in the field of view of the first camera).

In various embodiments of the present invention, each of the individual cameras 100 is a standard (e.g., commercial off-the-shelf) digital camera that includes a lens and an image sensor. In various embodiments, the image sensor may be a color image sensor (e.g., a visible light or red-green-blue or RGB sensor in, for example, a Bayer filter layout, where 25% of the pixels detect red light, 50% of the pixels detect green light, and 25% of the pixels detect blue light), an infrared (IR) image sensor, or a combination color and infrared (RGB-IR) sensor (e.g., a layout where 25% of the pixels detect red light, 25% of the pixels detect green light, 25% of the pixels detect blue light, and 25% of the pixels detect infrared light).

In some embodiments of the present invention, each of the individual cameras is a stereoscopic depth camera which includes at least two standard two-dimensional (2-D) cameras (e.g., at least two image sensors and corresponding lenses) that are rigidly fixed in position relative to one another. The 2-D cameras may be arranged to have overlapping fields of view and optical axes that are substantially parallel to one another. Features that appear in the images captured by the 2-D cameras are found and the differences (or "disparity") in the locations of those features within the images is used to compute a depth map representing the distances of the detected features from the location of the depth camera (larger disparities indicate a smaller distance from the depth camera and smaller disparities indicate a larger distance from the depth camera). In the case of a depth camera, the images captured by the depth camera may be referred to a depth images or as having a depth channel representing the distance between the camera and the surface depicted by the pixel of the image. A depth image may also be represented as a point cloud, which is a collection of 3-D points in a coordinate system. The standard 2-D cameras of a stereoscopic camera may include color image sensors, infrared image sensors, or combination color and infrared image sensors, or combinations thereof. For example, in some instances, the stereoscopic camera includes two color image sensors and one infrared image sensor. Examples of stereoscopic depth cameras will be described in more detail below.

Figure 1C:
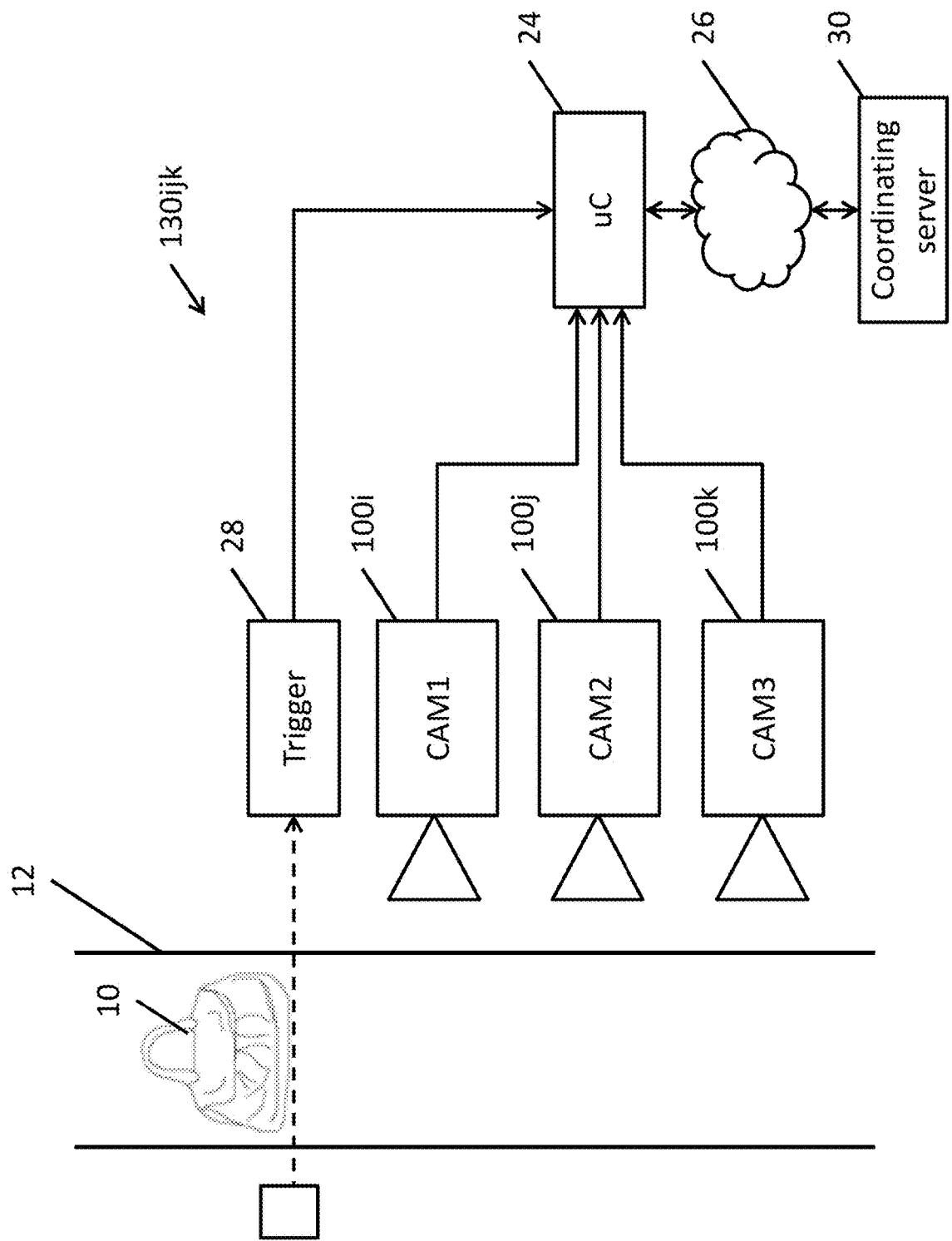
FIG. 1C is a schematic diagram of a camera group according to one embodiment of the present invention.

FIG. 1C is a schematic diagram of a camera group 130*ijk* according to one embodiment of the present invention. As shown in FIG. 1C, three cameras CAM1, CAM2, and CAM3 (respectively labeled 100*i*, 100*j*, and 100*k*) are configured to capture overlapping images different portions of objects 10 on conveyor system 12. The capture of images may be triggered by a triggering system, which may include a start trigger 28, which detects when an object 10 has entered the fields of view of the cameras 100*i*, 100*j*, and 100*k*. The start trigger 28 of the triggering system may include a laser emitter that is configured to send a triggering signal to a controller 24 (e.g., a computer or microcontroller, including a processor and memory) when the laser signal is interrupted by the presence of the object 10. The controller 24 may then control the cameras 100*i*, 100*j*, and 100*k* to begin capturing images of the object. In some embodiments of the present invention, the camera group 130*ijk* may include multiple triggers (see FIG. 5), such as an additional trigger to detect when the object has left the fields of view of the cameras 100*i*, 100*j*, and 100*k* (a stop trigger), and/or a trigger to detect when an object 10 is approaching the camera group 130*ijk*, thereby allowing the camera group 130*ijk* to perform setup or initialization operations prior to the arrival of the object (a prepare trigger). The cameras 100*i*, 100*j*, and 100*k* may be connected to the controller 24 through a peripheral interface base, such as universal serial bus (USB). In some other embodiments, the trigger can be obtained directly from imaging information acquired by one or more cameras in the group, such as by processing the captured image data at a lower resolution and/or by exploiting a proximity sensor or an additional illumination source.

The controller 24 may also be connected to a network 26 (e.g., an Ethernet 802.3 network or wireless LAN 802.11 network) to communicate with other devices, such as a coordinating server computer 30 and/or other camera groups 130. For example, the data captured by the cameras 100*i*, 100*j*, and 100*k* may be transferred to the coordinating server 30 through the network 26.

The various computing devices described herein, including the controller 24 and the coordinating server 30 may include one or more processors (e.g., central processing units, graphics processing units, field programmable gate arrays, and application specific integrated circuits) coupled with memory (e.g., dynamic memory and/or persistent memory) storing instructions that configure the computing devices to perform particular specific functions as described herein. The one or more processors may communicate with other devices, such as the cameras 100, through peripheral input/output devices such as network adapters and universal serial bus (USB) controllers.

Depth Camera Hardware

In some embodiments of the present invention, the depth cameras 100, also known as "range cameras," include at least two standard two-dimensional cameras that have overlapping fields of view. In more detail, these two-dimensional (2-D) cameras may each include a digital image sensor such as a complementary metal oxide semiconductor (CMOS) image sensor or a charge coupled device (CCD) image sensor and an optical system (e.g., one or more lenses) configured to focus light onto the image sensor. The optical axes of the optical systems of the 2-D cameras may be substantially parallel such that the two cameras image substantially the same scene, albeit from slightly different perspectives. Accordingly, due to parallax, portions of a scene that are farther from the cameras will appear in substantially the same place in the images captured by the two cameras, whereas portions of a scene that are closer to the cameras will appear in different positions.

Using a geometrically calibrated depth camera, it is possible to identify the 3-D locations of all visible points on the surface of the object with respect to a reference coordinate system (e.g., a coordinate system having its origin at the depth camera). Thus, a range image or depth image captured by a range camera 100 can be represented as a "cloud" of 3-D points, which can be used to describe the portion of the surface of the object (as well as other surfaces within the field of view of the depth camera).

Figure 1D:
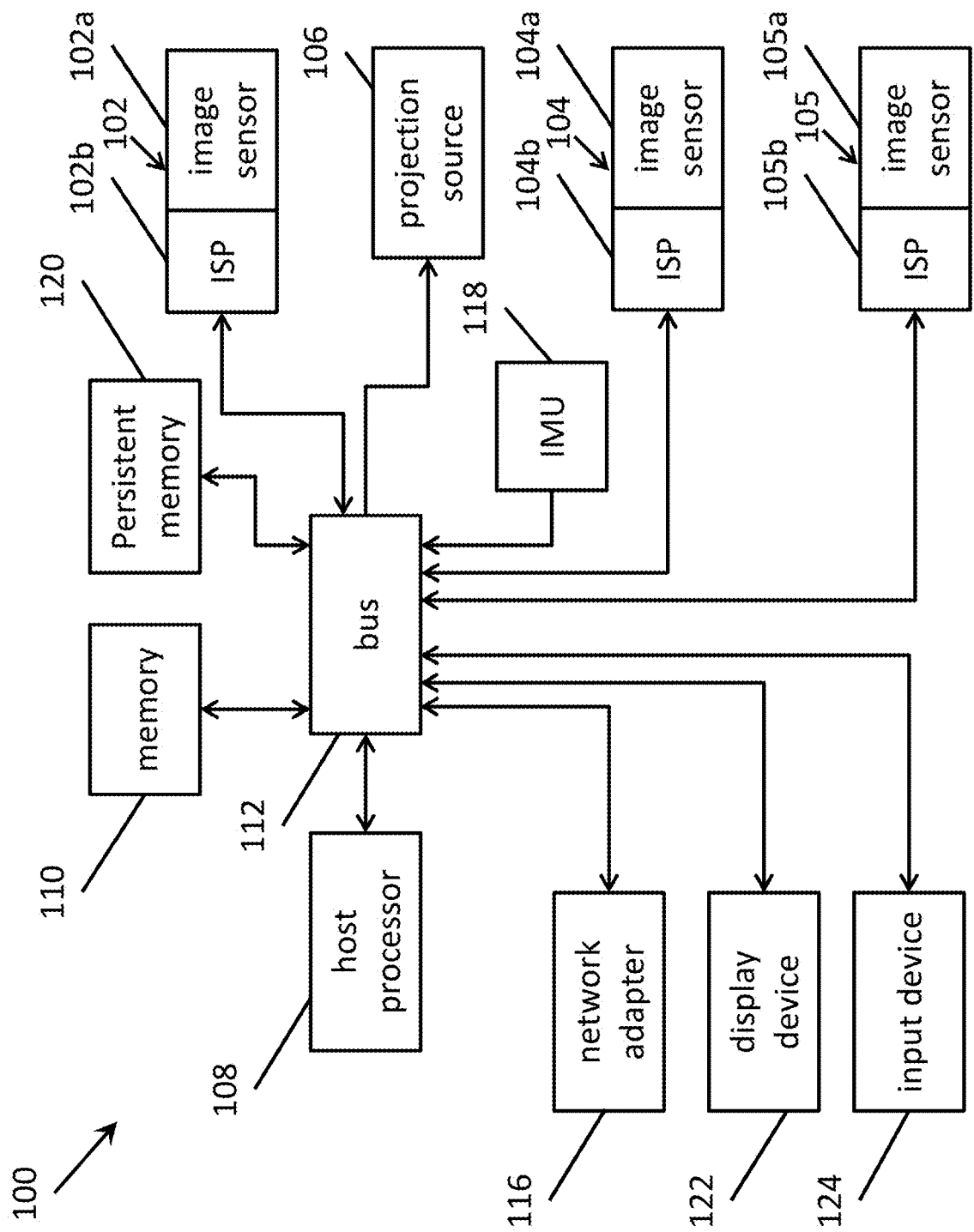
FIG. 1D is a schematic diagram of a depth camera suitable for use in a camera group according to one embodiment of the present invention.

FIG. 1D is a block diagram of a stereo depth camera system according to one embodiment of the present invention. The depth camera system 100 shown in FIG. 1D includes a first camera 102, a second camera 104, a projection source 106 (or illumination source or active projection system), and a host processor 108 and memory 110, wherein the host processor may be, for example, a graphics processing unit (GPU), a more general purpose processor (CPU), an appropriately configured field programmable gate array (FPGA), or an application specific integrated circuit (ASIC). The first camera 102 and the second camera 104 may be rigidly attached, e.g., on a frame, such that their relative positions and orientations are substantially fixed and such that their optical axes are substantially parallel and such that the first camera and second camera have overlapping fields of view. The first camera 102 and the second camera 104 may be referred to together as a "depth camera." The first camera 102 and the second camera 104 include corresponding image sensors 102a and 104a, and may also include corresponding image signal processors (ISP) 102b and 104b. The various components may communicate with one another over a system bus 112. The depth camera system 100 may include additional components such as a network adapter 116 to communicate with other devices, an inertial measurement unit (IMU) 118 such as a gyroscope to detect acceleration of the depth camera 100 (e.g., detecting the direction of gravity to determine orientation), and persistent memory 120 such as NAND flash memory for storing data collected and processed by the depth camera system 100. The IMU 118 may be of the type commonly found in many modern smartphones. The image capture system may also include other communication components, such as a universal serial bus (USB) interface controller. In some embodiments, the depth camera system 100 further includes a display device 122 and one or more user input devices 124 (e.g., a touch sensitive panel of the display device 122 and/or one or more physical buttons or triggers).

Although the block diagram shown in FIG. 1D depicts a depth camera 100 as including two cameras 102 and 104 coupled to a host processor 108, memory 110, network adapter 116, IMU 118, and persistent memory 120, embodiments of the present invention are not limited thereto. For example, the three depth cameras 100 shown in FIG. 6 (described in more detail below) may each merely include cameras 102 and 104, projection source 106, and a communication component (e.g., a USB connection or a network adapter 116), and processing the two-dimensional images captured by the cameras 102 and 104 of the three depth cameras 100 may be performed by a shared processor or shared collection of processors in communication with the depth cameras 100 using their respective communication components or network adapters 116. For example, controller 24 of FIG. 1C may be used to process 2-D images received from cameras 100$i$, 100$j$, and 100$k$ to generate three separate depth images corresponding to views captured by cameras 100$i$, 100$j$, and 100$k$.

In some embodiments, the image sensors 102a and 104a of the cameras 102 and 104 are RGB-IR image sensors. Image sensors that are capable of detecting visible light (e.g., red-green-blue, or RGB) and invisible light (e.g., infrared or IR) information may be, for example, charged coupled device (CCD) or complementary metal oxide semiconductor (CMOS) sensors. Generally, a conventional RGB camera sensor includes pixels arranged in a "Bayer layout" or "RGBG layout," which is 50% green, 25% red, and 25% blue. Band pass filters (or "micro filters") are placed in front of individual photodiodes (e.g., between the photodiode and the optics associated with the camera) for each of the green, red, and blue wavelengths in accordance with the Bayer layout. Generally, a conventional RGB camera sensor also includes an infrared (IR) filter or IR cut-off filter (formed, e.g., as part of the lens or as a coating on the entire image sensor chip) which further blocks signals in an IR portion of electromagnetic spectrum.

An RGB-IR sensor is substantially similar to a conventional RGB sensor, but may include different color filters. For example, in an RGB-IR sensor, one of the green filters in every group of four photodiodes is replaced with an IR band-pass filter (or micro filter) to create a layout that is 25% green, 25% red, 25% blue, and 25% infrared, where the infrared pixels are intermingled among the visible light pixels. In addition, the IR cut-off filter may be omitted from the RGB-IR sensor, the IR cut-off filter may be located only over the pixels that detect red, green, and blue light, or the IR filter can be designed to pass visible light as well as light in a particular wavelength interval (e.g., 840-860 nm). An image sensor capable of capturing light in multiple portions or bands or spectral bands of the electromagnetic spectrum (e.g., red, blue, green, and infrared light) will be referred to herein as a "multi-channel" image sensor.

In some embodiments of the present invention, the image sensors 102a and 104a are conventional visible light sensors (e.g., RGB sensors). In some embodiments of the present invention, the system includes one or more visible light cameras (e.g., RGB cameras) and, separately, one or more invisible light cameras (e.g., infrared cameras, where an IR band-pass filter is located across all over the pixels). In other embodiments of the present invention, the image sensors 102a and 104a are infrared (IR) light sensors. In some embodiments of the present invention, the image sensors 102a and 104a are infrared light (IR) sensors. In some embodiments (such as those in which the image sensors 102a and 104a are IR sensors) the depth camera 100 may include a third camera 105 including a color image sensor 105a (e.g., an image sensor configured to detect visible light in the red, green, and blue wavelengths, such as an image sensor arranged in a Bayer layout or RGBG layout) and an image signal processor 105b.

In some embodiments in which the depth cameras 100 include color image sensors (e.g., RGB sensors or RGB-IR sensors), the color image data collected by the depth cameras 100 may supplement the color image data captured by the color cameras 150. In addition, in some embodiments in which the depth cameras 100 include color image sensors (e.g., RGB sensors or RGB-IR sensors), the color cameras 150 may be omitted from the system.

Generally speaking, a stereoscopic depth camera system includes at least two cameras that are spaced apart from each other and rigidly mounted to a shared structure such as a rigid frame. The cameras are oriented in substantially the same direction (e.g., the optical axes of the cameras may be substantially parallel) and have overlapping fields of view. These individual cameras can be implemented using, for example, a complementary metal oxide semiconductor (CMOS) or a charge coupled device (CCD) image sensor with an optical system (e.g., including one or more lenses) configured to direct or focus light onto the image sensor. The optical system can determine the field of view of the camera, e.g., based on whether the optical system is implements a "wide angle" lens, a "telephoto" lens, or something in between.

In the following discussion, the image acquisition system of the depth camera system may be referred to as having at least two cameras, which may be referred to as a "master" camera and one or more "slave" cameras. Generally speaking, the estimated depth or disparity maps computed from the point of view of the master camera, but any of the cameras may be used as the master camera. As used herein, terms such as master/slave, left/right, above/below, and first/second are used interchangeably unless noted. In other words, any one of the cameras may be master or a slave camera, and considerations for a camera on a left side with respect to a camera on its right may also apply, by symmetry, in the other direction. In addition, while the considerations presented below may be valid for various numbers of cameras, for the sake of convenience, they will generally be described in the context of a system that includes two cameras. For example, a depth camera system may include three cameras. In such systems, two of the cameras may be invisible light (infrared) cameras and the third camera may be a visible light (e.g., a red/blue/green color camera) camera. All three cameras may be optically registered (e.g., calibrated) with respect to one another. One example of a depth camera system including three cameras is described in U.S. Pat. No. 9,674,504 "Depth Perceptive Trinocular Camera System" issued on Jun. 6, 2017, the entire disclosure of which is incorporated by reference herein. Such a three camera system may also include an infrared illuminator configured to emit light in a wavelength interval that is detectable by the infrared cameras (e.g., 840-860 nm).

To detect the depth of a feature in a scene imaged by the cameras, the depth camera system determines the pixel location of the feature in each of the images captured by the cameras. The distance between the features in the two images is referred to as the disparity, which is inversely related to the distance or depth of the object. (This is the effect when comparing how much an object "shifts" when viewing the object with one eye at a time—the size of the shift depends on how far the object is from the viewer's eyes, where closer objects make a larger shift and farther objects make a smaller shift and objects in the distance may have little to no detectable shift.) Techniques for computing depth using disparity are described, for example, in R. Szeliski. "Computer Vision: Algorithms and Applications", Springer, 2010 pp. 467 et seq.

The magnitude of the disparity between the master and slave cameras depends on physical characteristics of the depth camera system, such as the pixel resolution of cameras, distance between the cameras and the fields of view of the cameras. Therefore, to generate accurate depth measurements, the depth camera system (or depth perceptive depth camera system) is calibrated based on these physical characteristics.

In some depth camera systems, the cameras may be arranged such that horizontal rows of the pixels of the image sensors of the cameras are substantially parallel. Image rectification techniques can be used to accommodate distortions to the images due to the shapes of the lenses of the cameras and variations of the orientations of the cameras.

In more detail, camera calibration information can provide information to rectify input images so that epipolar lines of the equivalent camera system are aligned with the scanlines of the rectified image. In such a case, a 3-D point in the scene projects onto the same scanline index in the master and in the slave image. Let $u_m$ and $u_s$ be the coordinates on the scanline of the image of the same 3-D point p in the master and slave equivalent cameras, respectively, where in each camera these coordinates refer to an axis system centered at the principal point (the intersection of the optical axis with the focal plane) and with horizontal axis parallel to the scanlines of the rectified image. The difference $u_s - u_m$ is called disparity and denoted by d; it is inversely proportional to the orthogonal distance of the 3-D point with respect to the rectified cameras (that is, the length of the orthogonal projection of the point onto the optical axis of either camera).

Stereoscopic algorithms exploit this property of the disparity. These algorithms achieve 3-D reconstruction by matching points (or features) detected in the left and right views, which is equivalent to estimating disparities. Block matching (BM) is a commonly used stereoscopic algorithm. Given a pixel in the master camera image, the algorithm computes the costs to match this pixel to any other pixel in the slave camera image. This cost function is defined as the dissimilarity between the image content within a small window surrounding the pixel in the master image and the pixel in the slave image. The optimal disparity at point is finally estimated as the argument of the minimum matching cost. This procedure is commonly addressed as Winner-Takes-All (WTA). These techniques are described in more detail, for example, in R. Szeliski. "Computer Vision: Algorithms and Applications", Springer, 2010. Since stereo algorithms like BM rely on appearance similarity, disparity computation becomes challenging if more than one pixel in the slave image have the same local appearance, as all of these pixels may be similar to the same pixel in the master image, resulting in ambiguous disparity estimation. A typical situation in which this may occur is when visualizing a scene with constant brightness, such as a flat wall.

Methods exist that provide additional illumination by projecting a pattern that is designed to improve or optimize the performance of block matching algorithm that can capture small 3-D details such as the one described in U.S. Pat. No. 9,392,262 "System and Method for 3-D Reconstruction Using Multiple Multi-Channel Cameras," issued on Jul. 12, 2016, the entire disclosure of which is incorporated herein by reference. Another approach projects a pattern that is purely used to provide a texture to the scene and particularly improve the depth estimation of texture-less regions by disambiguating portions of the scene that would otherwise appear the same.

The projection source 106 according to embodiments of the present invention may be configured to emit visible light (e.g., light within the spectrum visible to humans and/or other animals) or invisible light (e.g., infrared light) toward the scene imaged by the cameras 102 and 104. In other words, the projection source may have an optical axis substantially parallel to the optical axes of the cameras 102 and 104 and may be configured to emit light in the direction of the fields of view of the cameras 102 and 104, where the emitted light is in a portion of the electromagnetic spectrum that is detectable by the cameras 102 and 104 (for example, when the cameras 102 and 104 are invisible light or infrared cameras, the projection source 106 projects light in the invisible light or infrared portion of the electromagnetic spectrum). Arrangements in which two cameras 102 and 104 are arranged with a projection source 106 in this manner is sometimes referred to as "active stereo." In some embodiments, the projection source 106 may include multiple separate illuminators, each having an optical axis spaced apart from the optical axis (or axes) of the other illuminator (or illuminators), and spaced apart from the optical axes of the cameras 102 and 104.

An invisible light projection source may be better suited to for situations where the subjects are people (such as in a videoconferencing system) because invisible light would not interfere with the subject's ability to see, whereas a visible light projection source may shine uncomfortably into the subject's eyes or may undesirably affect the experience by adding patterns to the scene. Examples of systems that include invisible light projection sources are described, for example, in U.S. Pat. No. 9,516,295 "Systems and Methods for Multi-Channel Imaging Based on Multiple Exposure Settings," issued on Dec. 6, 2016, the entire disclosure of which is herein incorporated by reference.

Active projection sources can also be classified as projecting static patterns, e.g., patterns that do not change over time, and dynamic patterns, e.g., patterns that do change over time. In both cases, one aspect of the pattern is the illumination level of the projected pattern. This may be relevant because it can influence the depth dynamic range of the depth camera system. For example, if the optical illumination is at a high level, then depth measurements can be made of distant objects (e.g., to overcome the diminishing of the optical illumination over the distance to the object, by a factor proportional to the inverse square of the distance) and under bright ambient light conditions. However, a high optical illumination level may cause saturation of parts of the scene that are close-up. On the other hand, a low optical illumination level can allow the measurement of close objects, but not distant objects.

Depth computations may fail in some region areas due to multiple factors, including: the mechanism used to compute depth (triangulation, with or without an active illuminator, or time of flight); the geometry of the scene (such as the angle between each surface element and the associated line of sight, or the presence of partial occlusion which may impede view by either sensor in a stereo system); and the reflectivity characteristics of the surface (such as the presence of a specular component which may hinder stereo matching or reflect away light from a projector, or a very low albedo causing insufficient light reflected by the surface). For those pixels of the depth image where depth computation fails or is unreliable, only color information may be available.

Although embodiments of the present invention are described herein with respect to stereo depth camera systems, embodiments of the present invention are not limited thereto and may also be used with other depth camera systems such as structured light time of flight cameras and LIDAR cameras.

Depending on the choice of camera, different techniques may be used to generate the 3-D model. For example, Dense Tracking and Mapping in Real Time (DTAM) uses color cues for scanning and Simultaneous Localization and Mapping (SLAM) uses depth data (or a combination of depth and color data) to generate the 3-D model.

Calibrating Camera Groups

Aspects of embodiments of the present invention relate to systems and methods for placing cameras of a camera group such that the actual poses of the cameras match their designed poses (or a reasonable approximation thereof) or satisfy a particular level of coverage of the scene.

Figure 2:
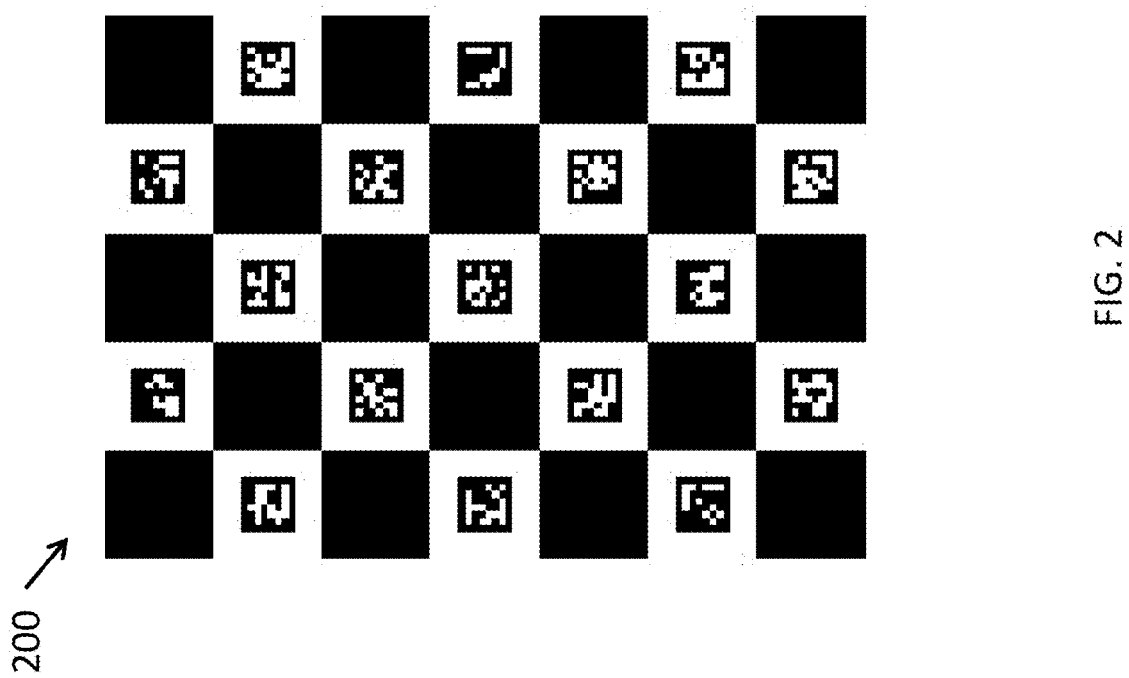
FIG. 2 is an example of a ChArUco board, which is one type of calibration target that can be used in connection with embodiments of the present invention.

One technique for calibrating cameras involves the use of calibration targets of known size and shape. FIG. 2 is an example of a ChArUco pattern, which is one type of calibration target that can be used in connection with embodiments of the present invention. The ChArUco pattern 200 shown in FIG. 2 includes a checkerboard pattern of alternating black and white squares with ArUco fiducial markers in each of the white squares (for more information about ArUco markers, see Garrido-Jurado, Sergio, et al. "Automatic generation and detection of highly reliable fiducial markers under occlusion." *Pattern Recognition* 47.6 (2014): 2280-2292.). Each of the fiducial markers on the target is different, thereby communicating information about the orientation of the calibration target with respect to the camera, and also enabling calibration information to be derived from images that depict only a portion of the ChArUco board (albeit with reduced confidence). However, embodiments of the present invention are not limited to the use of a ChArUco board as a calibration target. In some embodiments of the present invention, the calibration target may include any pattern having a known size and known texture properties (e.g., a set of circles).

Capturing images with a calibration target within the field of view of a camera allows the intrinsic parameters and the distortion parameters of that camera to be computed. In addition, when the same calibration target in the scene is imaged by multiple cameras, the appearance of the calibration target in the images captured by the multiple cameras can be used to compute the extrinsic parameters (e.g., the relative poses) of those cameras. However, in order for the same calibration target to be captured by multiple cameras, the cameras must have at least partially overlapping fields of view. As noted above, embodiments of the present invention are not limited to circumstances where the calibration target is or includes a ChArUco board—in some embodiments, the calibration target may be a pattern of known size and having a known texture that is suitable for calibration purposes (e.g., where the patterns allow estimation the transformations between world coordinates and the camera coordinates of images captured by the cameras, such as a chessboard, a square grid, a grid of ArUco fiducials, a circle hexagonal grid, and a circle regular grid).

Figure 3A:
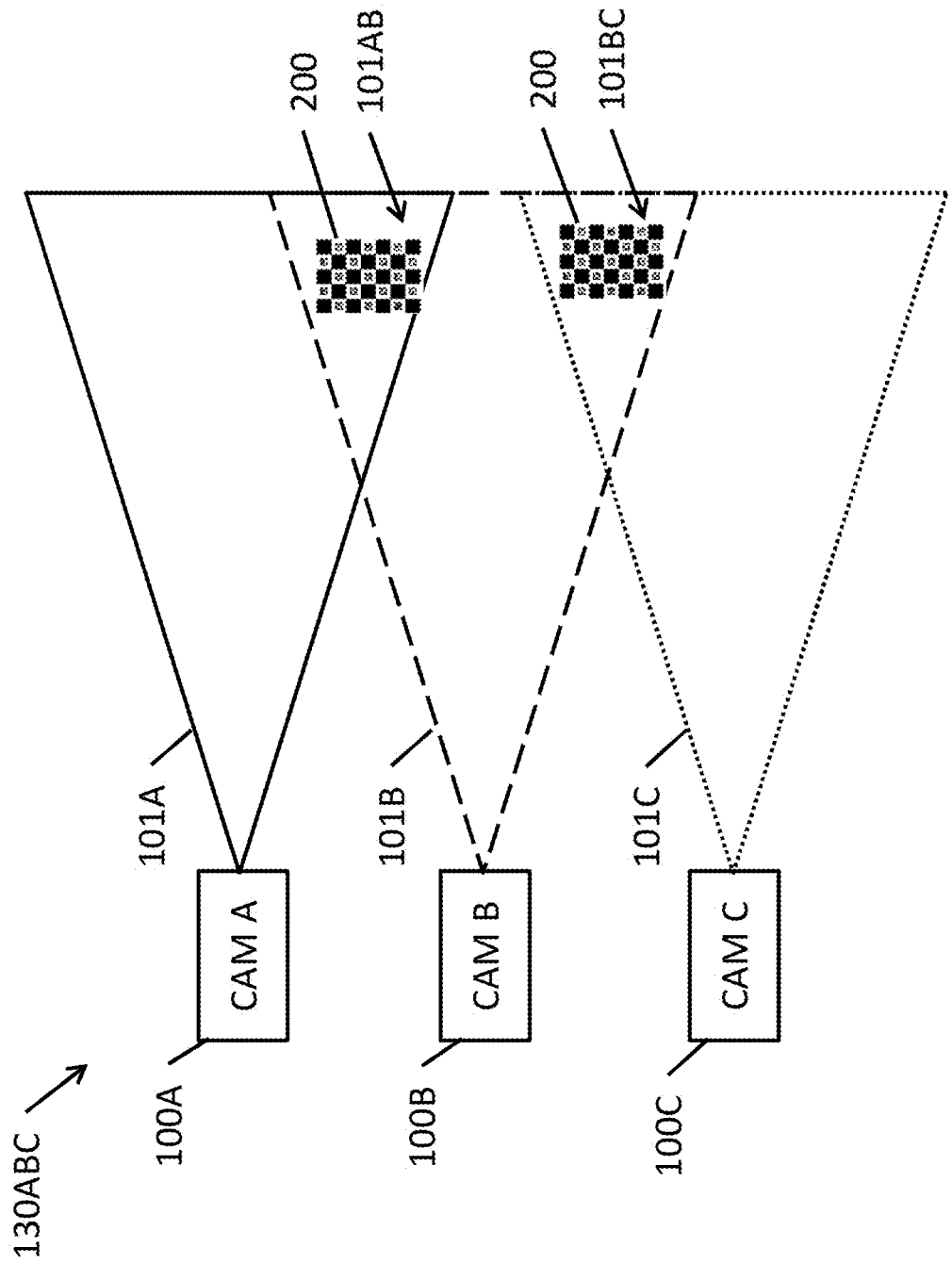
FIG. 3A is a schematic diagram of three cameras of a camera group according to one embodiment of the present invention and their corresponding fields of view, shown with solid line, a dashed line, and a dotted line, respectively.

In some embodiments of the present invention, a camera group includes three or more cameras, where the field of view of each camera overlaps with the field of view of at least one other camera of the camera group, but not necessarily the fields of view of all other cameras. FIG. 3A is a schematic diagram of three cameras 100A, 100B, and 100C of a camera group 130ABC according to one embodiment of the present invention and their corresponding fields of view 101A, 101B, and 101C, shown with solid line, a dashed line, and a dotted line, respectively. As seen in FIG. 3A, the fields of view of CAM A 100A and CAM B 100B overlap in a first region 101AB and the fields of view of CAM B 100B and CAM C 100C overlap in a second region 101BC.

Accordingly, CAM A 100A can be calibrated with respect to CAM B 100B by placing a calibration target 200 in the first overlapping region 101AB and controlling CAM A 100A and CAM B 100B to capture images of the calibration target 200.

Similarly, CAM B 100B can be calibrated with respect to CAM C 100C by placing a calibration target 200 in the second overlapping region 101BC and controlling CAM B 100B and CAM C 100C to capture images of the calibration target 200.

In the arrangement shown in FIG. 3A, the first field of view 101A of CAM A 100A does not overlap with the third field of view 101C of CAM C 100C, and therefore it is not possible to directly calibrate these two cameras with respect to one another because it is not possible to place the calibration target in a position where it would be visible to both CAM A 100A and CAM C 100C. However, the separate calibrations (or relative poses) of CAM A 100A and CAM C 100C with respect to CAM B 100B can be used to infer the relative poses of CAM A 100A and CAM C 100C. Accordingly, aspects of embodiments are directed to computing estimated poses for all of the cameras in a camera group with respect to a single coordinate system for the camera group, even when not all of the fields of view of the cameras overlap.

For the sake of convenience, a calibration target 200 or other object (e.g., target object 10) will be referred to as visible by a camera group 130 when calibration target or object is in the foreground of any of the field of view 101 of the cameras 100 of the camera group. For example, in the case of FIG. 3A, the calibration target 200 will be considered to be visible to the camera group 130ABC when the calibration target 200 is in the foreground of any of the fields of view 101A, 101B, and 101C of cameras 100A, 100B, and 100C of the camera group 130ABC.

More generally speaking, each camera 100 of the camera group 130 can be considered as a camera node in a graph and each position of the calibration target 200 (or each of the calibration targets) within the field of view 101 of at least one of the cameras 100 can be represented as a calibration target node, where an edge between a camera node and a calibration target node in the graph indicates that the camera corresponding to that camera node can see the calibration target in its field of view.

Figure 3B:
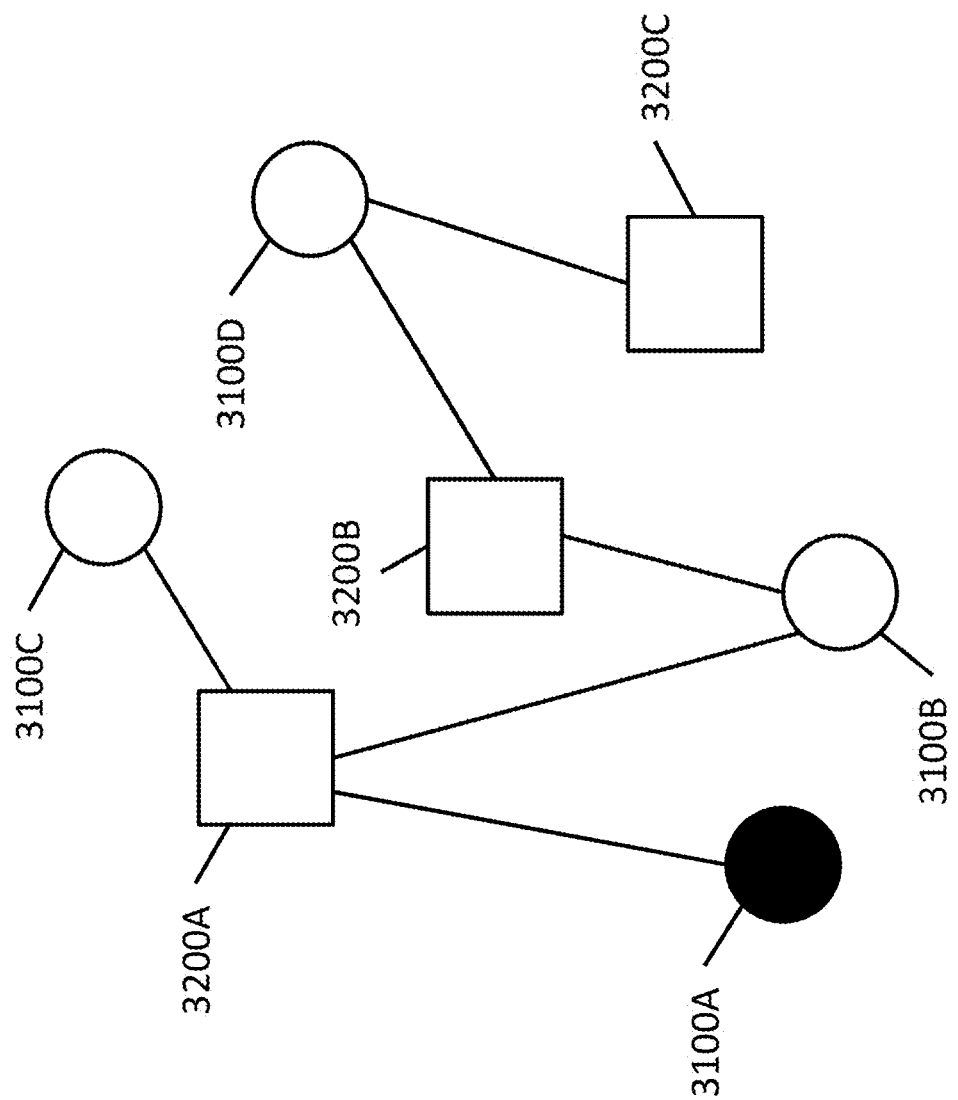
FIG. 3B is an example of a graph illustrating the relationship between cameras and calibration targets (e.g., checkerboards) according to one embodiment of the present invention.

FIG. 3B is an example of a graph 3000 illustrating the relationship between cameras 100 and calibration targets 200 (e.g., checkerboards) according to one embodiment of the present invention, where camera nodes 3100 are shown with circles and calibration target nodes (or checkerboard nodes) 3200 are shown with squares. The filled-in camera node 3100A at the lower left corresponds to a "reference camera," where the coordinate system of the cameras 100 in the camera group 130 are computed in reference to the coordinate system of the reference camera. Accordingly, a camera group 130 is represented by a connected graph 3000. The graph 3000 representing the camera group 130 does not need to be fully connected in order to be able to calibrate the camera group (e.g., there is no requirement that some portion of the field of view of every camera with some portion of the field of view of every other camera such that there is an edge from every camera node to every calibration target). Instead, to calibrate the camera group, it is sufficient that the graph be connected, that is, where there is some path from every camera node 3100 to every other camera node 3100 in the graph 3000 through at least one calibration target node 3200.

Figure 4:
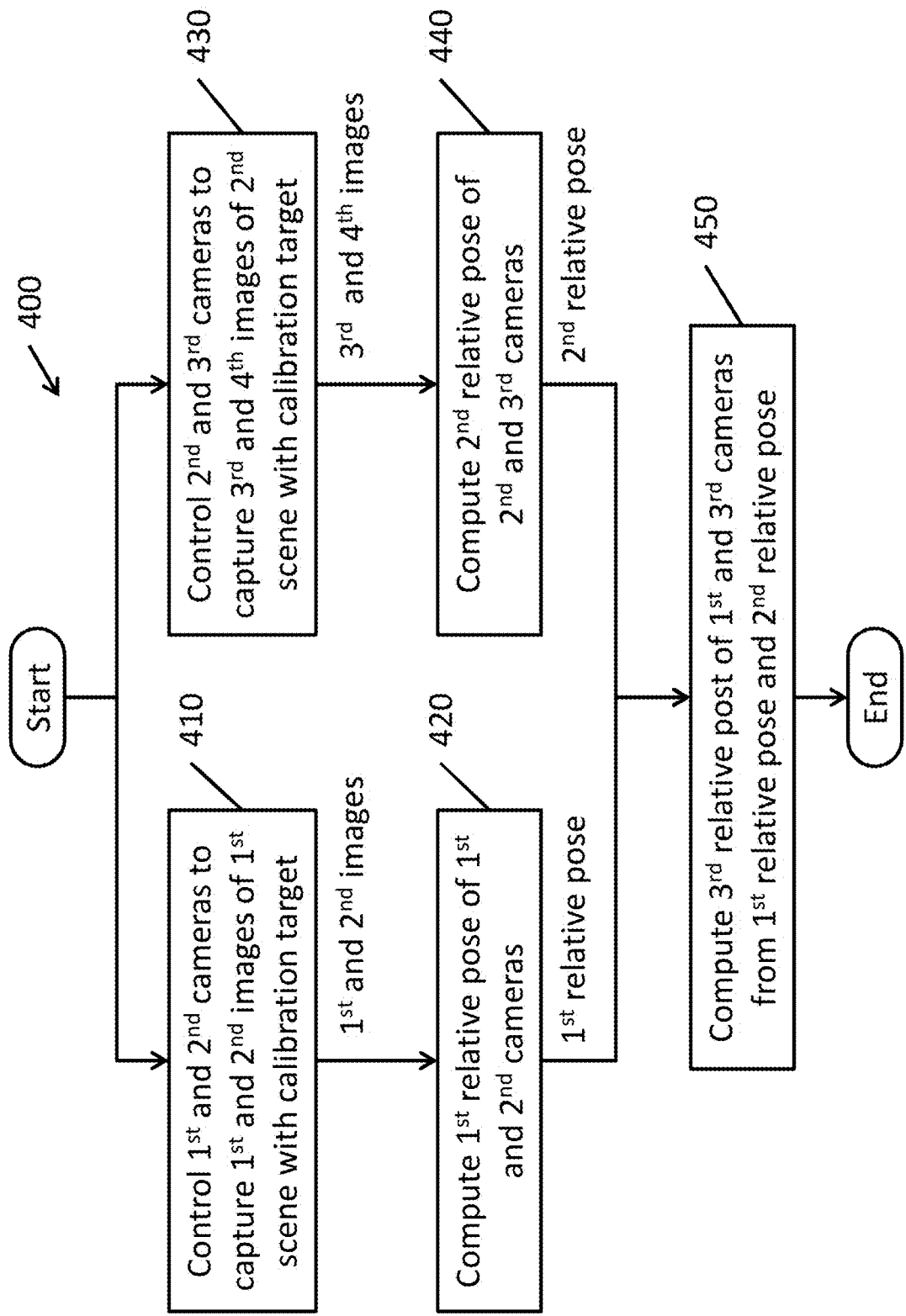
FIG. 4 is a flowchart of a method according to one embodiment of the present invention of computing the relative poses of cameras of a camera group.

FIG. 4 is a flowchart of a method 400 according to one embodiment of the present invention of computing the relative poses of cameras of a camera group. The method may be performed by an appropriate controller or computing device including a processor and memory (e.g., an embedded system, a microcontroller, a tablet computer, a server computer, and the like), where the memory stores instructions that, when executed by the processor, cause the processor to perform these functions. For example, in some embodiments of the present invention, the method is implemented by the controller 24 of the camera group 130.

As shown in FIG. 4, in operation 410, the controller 24 controls the first and second cameras (e.g., CAM A 100A and CAM B 100B) of a camera group to capture first and second images (e.g., capturing the images substantially simultaneously), respectively of a first scene where a calibration target is located in the fields of view (e.g., 101A and 101B) of both cameras (e.g., CAM A 100A and CAM B 100B). The calibration target 200 is located in substantially the same place in the real world at the time of capture of both the first and second images.

In some circumstances, the calibration target 200, or a portion thereof, may be visible to more than two of the cameras 100 in the camera group 130. However, for the sake of convenience, the case where only two cameras image the calibration target will be described in detail herein. For the case where the calibration target can be detected in more than two cameras in a particular configuration of a scene, in some embodiments, pairwise calibrations can be performed among the cameras 100 that can image the calibration target 200, and the additional data regarding the relative poses of the cameras may be used to refine the pose estimations (e.g., by computed averages of the computed relative poses, weighted based on confidence in the estimated pose).

In operation 420, the controller 24 computes a first relative pose of the first and second cameras (CAM A 100A and CAM B 100B) based on the appearance of the calibration target 200 in the first and second images. For example, the first relative pose may be defined as a three dimensional (3-D) rigid transformation that would map the location and orientation ("pose") of the second camera (CAM B 100B) onto the pose of the first camera (CAM A 100A). Alternatively, and equivalently, the first relative pose may include two transformations: a transformation from the pose of the first camera (CAM A 100A) to a world coordinate system and a transformation from the pose of the second camera (CAM B 100B) to the same world coordinate system.

Likewise, in operation 430, the controller 24 controls the second and third cameras (e.g., CAM B 100B and CAM 100C) of the camera group 130 to capture third and fourth images (e.g., substantially simultaneously) of a second scene, where the calibration target 200 is within the fields of view (e.g., 101B and 101C) of the second and third cameras. Again, the calibration target 200 is located in substantially the same place in the real world at the time of capture of the third and fourth images. The calibration target 200 may be located in a different place in the real world than it was located during the capture of the images in operation 410. Referring back to FIG. 3A, the calibration target 200 may have been located in a first region 101AB visible to the first camera 100A and the second camera 100B during operation 410 and in a different region 101BC visible to the second camera 100B and third camera 100C during operation 430. In some embodiments, the calibration target 200 is moved (e.g., rigidly transformed, including translation and rotation, and substantially without deformation such as bending or folding of the calibration target) from the first region 101AB to the second region 101BC by a conveyor system 12.

In operation 440, the controller computes a second relative pose of the second and third cameras based on the appearance of the calibration target 200 in the third and fourth images. For example, the second relative pose may be a three dimensional (3-D) rigid transformation that would map the location and orientation ("pose") of the third camera (CAM C 100C) onto the pose of the second camera (CAM B 100B). Alternatively, and equivalently, the second relative pose may include two transformations: a transformation from the pose of the second camera (CAM B 100B) to the world coordinate system and a transformation from the pose of the third camera (CAM C 100C) to the same world coordinate system.

As noted above, the calculated poses may be associated with confidence estimates (e.g., values in the range of 0 to 1) representing the confidence of the pose estimated based on the image of the calibration target. In various circumstances, the reduced confidence may be due to ambiguities in the relative position and orientation of the calibration target 200 with respect to the cameras 100. For example, as noted above, the confidence may be reduced in circumstances where only a part of the board is visible. As additional examples, when the calibration target is located far from the camera or otherwise makes up a small portion of the image captured by the camera or when the calibration target is imaged at an angle close to parallel to the plane of the calibration target, difficulties in resolving the details of the calibration target may cause ambiguity in the computed pose.

In operation 450, the controller computes a third relative pose between the first camera (CAM A 100A) and the third camera (CAM C 100C) based on the first and second relative poses. For example, the third relative pose may be the composition of the transformation from the pose of the third camera (CAM C 100C) to the pose of the second camera (CAM B 100B) with the transformation from the pose of the second camera (CAM B 100B) to the pose of the first camera (CAM A 100A).

Accordingly, aspects of embodiments of the present invention are directed to computing relative poses (extrinsic calibration parameters) between cameras of a camera group that do not necessarily have overlapping fields of view.

While the above technique would apply to circumstances where the first camera and the third camera do not have overlapping fields of view, embodiments of the present invention are not limited thereto. For example, if the first camera (CAM A 100A) did have an overlapping field of view 101A with the field of view 101C of the third camera (CAM C 100C), then a separately computed calibration based on images of a calibration target in an overlapping region of their respective fields of view can be used to confirm the calibration computed by way of the second camera CAM B 100B.

Alternatively, supposing that the camera group included a fourth camera (e.g., CAM D) having a field of view that overlapped with the fields of view of the first camera (CAM A) and the third camera (CAM C), a third relative pose (between CAM C and CAM D) and a fourth relative pose (between CAM D and CAM A) can be computed from images containing a calibration target in the overlapping regions. The third and fourth relative poses can be compared against the relative poses computed through the chain of cameras of the camera group. For example, the relative pose computed directly between CAM D and CAM A can be compared against the relative pose between those cameras, as computed through the composition of rigid transformations from CAM D to CAM C, from CAM C to CAM B, and from CAM B to CAM A.

As such, embodiments of the present invention also allow for confirmation and computations of confidences in the individual calibrations based on the level of agreement between poses (e.g., positions and orientations) computed through different paths through the graph of nodes in the graph representation of the camera group as well as the fraction or amount of the calibration target that is captured in the images (e.g., a ChArUco board).

Furthermore, as discussed above, in some embodiments of the present invention, each camera 100 includes two or more standard 2-D cameras (e.g., cameras 102, 104, and 105) that are rigidly mounted and calibrated with respect to one another (e.g., in the case of stereoscopic cameras). Accordingly, the images captured by the separate standard 2-D cameras of the stereoscopic camera can be used to provide additional data regarding the position and orientation of each camera 100.

The process illustrated in FIG. 4 and as discussed above can be used to calculate the relative poses of the cameras 100 in their configuration at the time that they capture the images of the calibration target 200. This estimate of the current poses of the cameras can then be compared against a designed or desired set of relative poses of the cameras (e.g., as designed or specified based on the types of objects that are expected to be imaged by the camera group).

Figure 5:
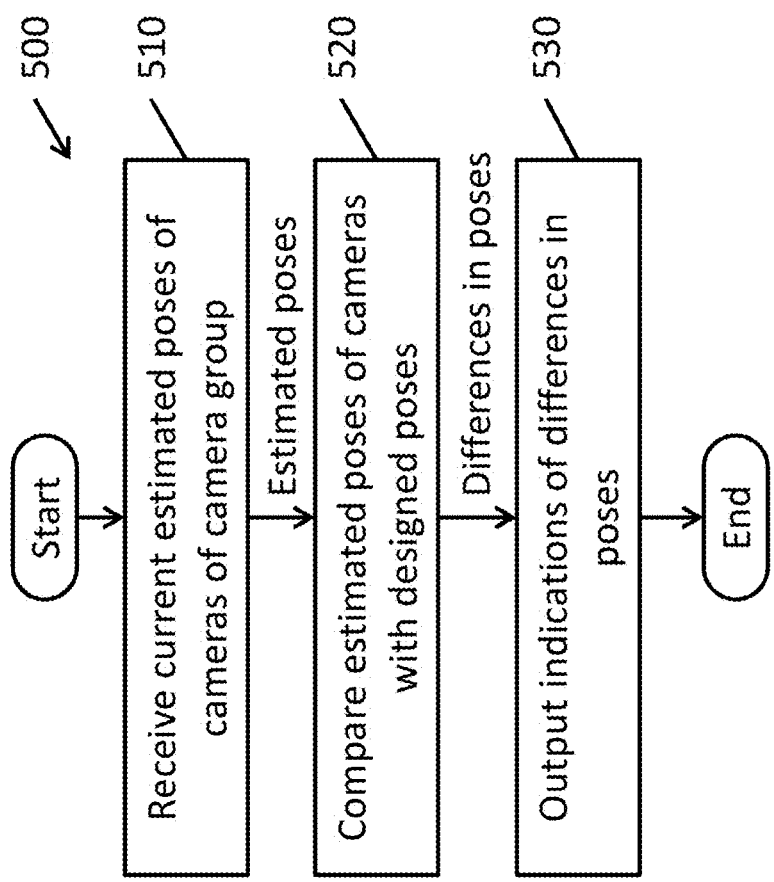
FIG. 5 is a flowchart of a method according to one embodiment of the present invention for computing an adjustment to a camera of a camera group.

FIG. 5 is a flowchart of a method 500 according to one embodiment of the present invention for computing an adjustment to a camera 100 of a camera group 130. In operation 510, the controller 24 receives estimated poses of the cameras 100 of the camera group 130, as estimated, for example, by applying various portions of the process shown in FIG. 4 to all of the cameras 100 in the camera group 130. For example, the estimated poses may all be relative to the world coordinate system or relative to one of the cameras of the camera group. In operation 520, the controller 24 compares the estimated poses with the designed or desired set of relative poses of the cameras 100 to compute a set of differences in poses (e.g., a deviation of each camera from its designed or desired pose). In operation 530, the controller 24 outputs indications of the differences of these poses.

In some embodiments of the present invention, the indications of the differences that are computed by the controller are displayed on a user interface (e.g., the screen of a tablet computer, the screen of a smartphone, on an augmented reality headset, and the like). The user interface may indicate a rigid transformation (e.g., a translation and/or a rotation) for each camera, as needed, to reconfigure (e.g., move) the camera to the designed or desired pose (e.g., with colors indicating the magnitude of deviation). Cameras that are already in the designed or desired pose may also be labeled as not requiring configuration (e.g., shown in green). In some embodiments of the present invention, the user interface may also indicate, for each camera, whether a calibration target is within the field of view of the camera.

In some aspects of embodiments of the present invention, the user interface also displays the confidence of the estimated poses of each of the cameras, where, as discussed above, the confidence is determined based on the level of agreement between the calculations of the estimated poses directly based on a calibration with respect to a camera having an overlapping field of view (e.g., an adjacent node in the graph) and based on a chain of poses calculated with respect to one or more intermediate cameras. The confidence may be expressed, for example, as a percentage or as ranges of possible values based on the different calculations (e.g., ranges of positional and angular coordinates). The confidence level may be used by the operator or by the system to determine whether additional calibration images need to be captured (e.g., capturing additional images with the calibration target in various locations within the overlapping fields of views of cameras).

In some embodiments of the present invention, each camera 100 of the camera group 130 includes or more indicators on the outside of the camera 100. These indicators may be lights (e.g., light emitting diodes), where the controller may output the indications of the differences in poses in the form of blinking or glowing lights. More concretely, the cameras 100 may include a plurality of light emitting diodes on the sides of the cameras (e.g., if each camera is a hexahedron such as a cube or a rectangular prism). For example, a blinking light may indicate a deviation from a desired position and may be used to indicate the direction in which the camera should be moved or rotated (e.g., lights blinking on opposite sides of the camera may indicate a direction along which the camera should be translated while lights on adjacent sides of the camera may blink in sequence to indicate a direction of rotation). A solid light may indicate that the camera is in the correct position. In some embodiments of the present invention, the indicators on the camera may also indicate whether a calibration target is within the field of view of the camera.

After the cameras have been reconfigured, the process of estimating the poses of the cameras 100 can be performed again (e.g., by capturing more images of calibration targets) and the resulting new set of poses can be compared against the desired or designed poses. In some embodiments, the process of pose estimation, pose comparison, and indicator update is performed continuously such that the indicators and/or the user interface are updated to provide real-time feedback as the cameras 100 are reconfigured. In addition, the calculation of the estimated poses may be performed continuously as the calibration target is moved within the fields of view of the cameras 100.

In some embodiments, the reconfiguration of the cameras may be performed manually by a human operator based on the indications.

In some embodiments, a robot performs the reconfiguration of the cameras based on the indications output by the controller performing the pose estimation and comparison of differences of poses.

In some embodiments, the cameras are mounted to supports by actuators that allow repositioning of the cameras (e.g., stepper motors) and the indications output by the controller are used to control the actuators to move the cameras to the desired poses.

The techniques described above may be applied to a process of initially setting up a set of cameras, as well as for detecting when a camera group has become misconfigured (e.g., due to one or more cameras being bumped during normal operations).

Some aspects of embodiments of the present invention also relate to verifying the configuration and adjustment of the cameras 100 of the camera group 130 by, for example, capturing images of a different calibration target and computing estimated poses based on the newly captured information.

Some aspects of embodiments of the present invention relate to adding one or more additional cameras to the camera group and computing estimated poses of the newly added cameras with respect to the poses of the existing cameras of the camera group. The addition of new cameras can proceed in substantially the same manner as described above, where the cameras may be added one at a time, where the field of view of the newly added camera overlaps with the field of view of at least one of the existing cameras in the camera group 130, thereby allowing estimation of the pose of the new camera based on the appearance of a calibration target in the region of the overlap of the fields of view.

Similarly, when the pose of one or more cameras needs to be reconfigured, a similar process can be used to re-compute the poses of the cameras of the camera group 130. A reconfiguration may be performed because the one or more cameras has become misplaced or misconfigured with respect to the position of the target object or the other cameras (e.g., because those cameras have been bumped or misaligned), or because the position or shape of the target object is different from the designed position (e.g., the height of the conveyor belt is different from what was expected or a camera angle needs to be adjusted to image particular portions of the target object), thereby requiring redesign of the arrangement of the cameras of the camera group and a corresponding adjustment of the poses of the cameras 100 to capture better images of the target object 10, or other aspects of the scene impose constraints on the placement of the cameras (e.g., equipment around the conveyor belt prevents cameras from being located in particular places).

As discussed above, in the cameras 100 may include visible light (e.g., red, green, and blue color) image sensors, infrared sensors, combination RGB-IR sensors, and combinations of these different types of sensors. In some conditions, it may be difficult for a camera system to be able to detect a calibration target in the overlapping fields of view of the cameras. For example, the regions of the overlapping fields of view may be dimly lit at the location where the camera group is to be installed. Accordingly, some aspects of embodiments of the present invention relate to the use of a back-illuminated calibration target.

Figure 6:
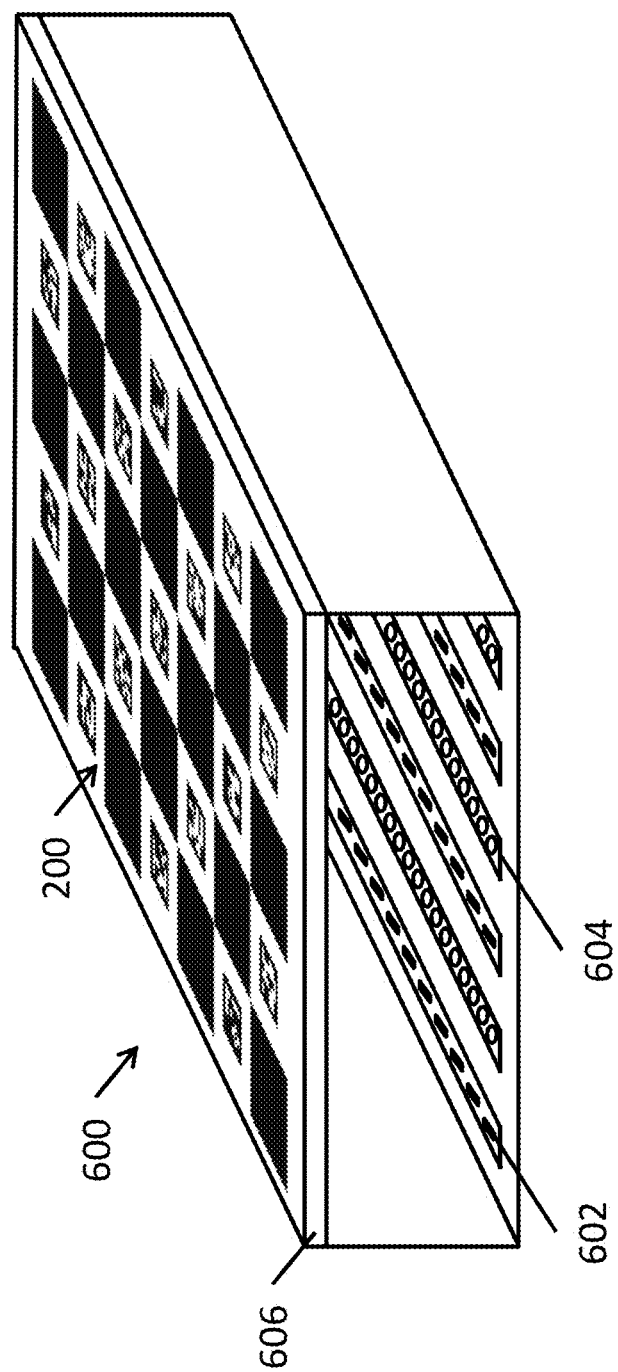
FIG. 6 is a schematic cut-away diagram of a back illuminated calibration target according to one embodiment of the present invention.

FIG. 6 is a schematic cut-away diagram of a back illuminated calibration target according to one embodiment of the present invention. As shown in FIG. 6, in one embodiment, the back illuminated calibration target includes one or more strips of infrared light emitting diodes 602 and color light emitting diodes (e.g., white light emitting diodes, or red, green, and blue light emitting diodes) 604 mounted in a housing and configured to emit light toward a diffuser 606. A calibration target 200 may then be applied to an opposite side of the diffuser 606, such that diffused color and infrared light is emitted through the calibration pattern 200, thereby improving the ability of the cameras 100 to detect the calibration pattern. However, embodiments of the present invention are not limited thereto and may be used with other arrangements for generating a backlit calibration target (e.g., different light sources capable of generating visible and infrared light).

Use of a sufficiently bright backlit calibration target can also improve the ability of the system to generate meaningful poses when the calibration target is moved in the scene. For example, in more dimly lit conditions, the shutter speed of the cameras may be set to longer values, thereby resulting in motion blur as the calibration target moves, thereby resulting in problems with using the captured images for calibration. On the other hand, if the calibration target is sufficiently brightly lit, the shutter speed can be set to shorter values, thereby reducing or substantially removing the motion blur, and thereby enabling the capture of additional information for performing more accurate pose estimation of the cameras.

In addition to calibrating the cameras within a camera group with respect to one another, aspects of embodiments can also be used to determine an offset or transformation between "chunks" of data captured by different ones of the camera groups 130 (see FIG. 1B). When these offsets or transformations between camera groups are known, chunks that are captured by different camera groups can easily be merged together, even when there is little overlap in the shapes of the chunks captured by the different camera groups (e.g., if the chunks corresponded to point clouds representing different parts of the target object, if there were sufficient overlap in the portions of the target object represented in the point clouds, then a technique such as iterative closest point may be used to merge the point clouds).

Figure 7:
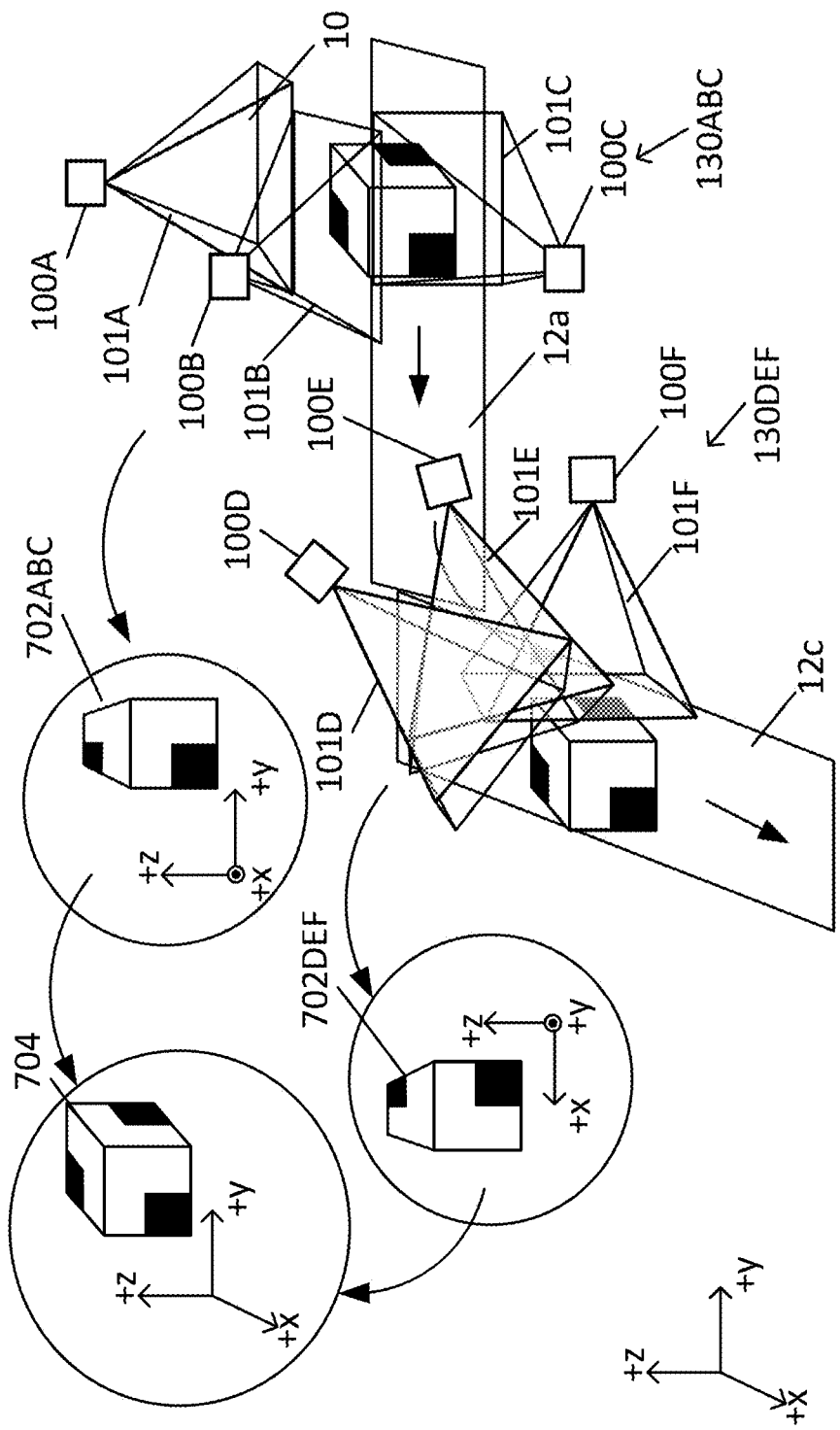
FIG. 7 is a schematic diagram of two camera groups according to embodiments of the present invention, positioned at different portions of a manufacturing line.

FIG. 7 is a schematic diagram of two camera groups 130ABC and 130DEF according to embodiments of the present invention, positioned at different portions of a manufacturing line to image objects on a conveyor system 12. The diagram shown in FIG. 7 is merely illustrative and is not shown with accurate perspective with respect to the shown coordinate axes. The two camera groups 130ABC and 130DEF are independent, and may be positioned far from each other such that it is difficult or impossible to calibrate the camera groups 130ABC and 130DEF with respect to one another by placing a calibration target 200 in a location that is simultaneously within the fields of view of at least one camera 100 of each group 130. On the other hand, each camera group 130 may be calibrated with respect to a reference global coordinate system, where the reference coordinate system may be set based on, for example the coordinate system of the first camera group 130ABC. Offsets between the first camera group 130ABC and 130DEF may be then determined, for example, by placing a calibration target on the conveyor system 12 and ensuring that the conveyor system 12 performs the same physical rigid transformations (e.g., rotations and translations) on the calibration target as would be performed on a target object 10 on the conveyor system 12.

By calibrating the two camera groups 130ABC and 130DEF with respect to one another (e.g., estimating the relative poses of the two camera groups with respect to a target object), images and/or 3-D models 702ABC and 702DEF respectively captured by the two camera groups 130ABC and 130DEF can be merged (e.g., by the coordinating server 30 shown in FIG. 1C) to generate combined 3-D model 704 merely by aligning the models, without rotation, because the models are captured with respect to a global coordinate system. The coordinate axes shown adjacent models 702ABC and 702DEF in FIG. 7 are not intended to be accurate depictions of the directions of the coordinate systems associated with the views of the models, but are merely intended to show the general direction along which the models are viewed. Nevertheless, the associated coordinate systems are intended to reflect consistency between the coordinate systems of the first camera group 130ABC and the second camera group 130DEF.

While FIG. 7 merely shows an object that is translated by the conveyor system 12 without rotation, embodiments of the present invention are not limited thereto and may also be applied in cases where conveyor systems 12 perform rigid transformations between camera groups that include rotations.

Figure 8:
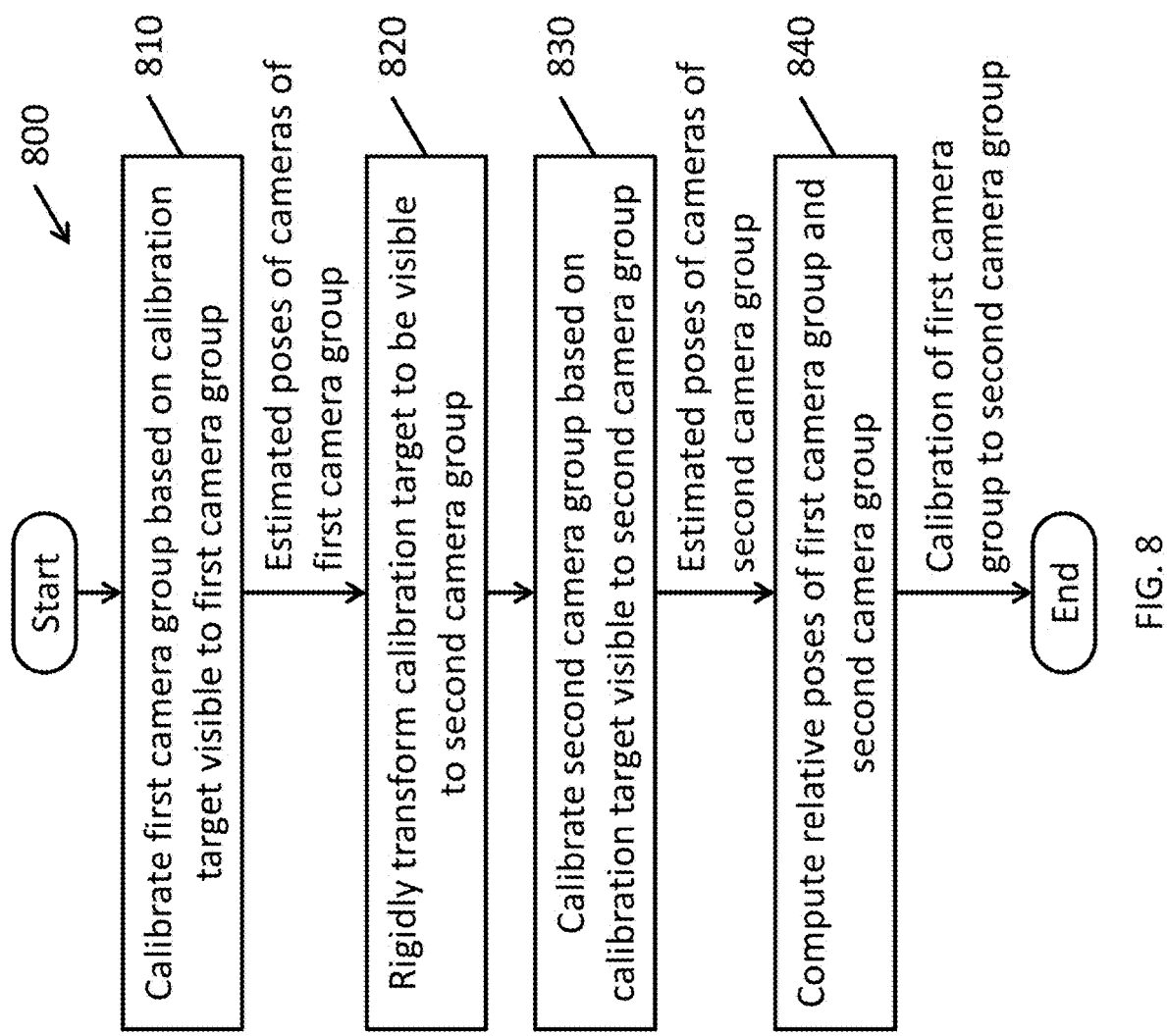
FIG. 8 is a flowchart of a method for calibrating two camera groups with respect to one another according to one embodiment of the present invention.

FIG. 8 is a flowchart of a method 800 for calibrating two camera groups with respect to one another according to one embodiment of the present invention. In some embodiments of the present invention, the method shown in FIG. 8 is performed by the coordinating server 30. In operation 810, the first camera group 130ABC is calibrated by controlling a camera group (e.g., a controller 24) to calibrate the group based on images captured of a calibration target 200 carried by a portion of the conveyor system 12 that is visible to the first camera group (e.g., camera group 130ABC as shown in FIG. 7). As noted above, in some circumstances, a calibration target 200 is not simultaneously visible to all cameras 100 of a camera group, but the cameras 100 of the camera group 130 can be calibrated as a whole (e.g., computing the relative poses of the cameras with respect to one another or, equivalently, with respect to a global coordinate system) if images are captured of a calibration target In operation 820, the conveyor system 12 is used to perform a rigid transform on the calibration target 200 to move the calibration target to be visible to the second camera group (e.g., camera group 130DEF as shown in FIG. 7). It is assumed that the rigid transformation applied by the conveyor system 12 is consistent and repeatable and that the conveyor system performs the same rigid transformation on target objects 10.

In operation 830, the second camera group is calibrated using the calibration target 200 as now visible to that second camera group (e.g., by using the controller 24 of the camera group to perform a calibration). Accordingly, in operation 840, the coordinating server 30 may combine the estimated poses of the cameras of the first camera group computed in operation 810 and the estimated poses of the cameras of the second camera group computed in operation 830 to compute the relative poses of the first camera group and the second camera group with respect to a global coordinate system (e.g., relative to the objects conveyed by the conveyor system 12).

As such, aspects of embodiments of the present invention relate to systems and methods for configuring cameras of a camera group, including estimating the poses of the cameras of the camera group, detecting deviations of the estimated poses from a set of designed poses, and adjusting the poses of the cameras to match the designed poses.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A system for placing and calibrating cameras comprising a first camera group comprising:
   a first camera having a first field of view;
   a second camera having a second field of view overlapping the first field of view in a first overlap region;
   a third camera having a third field of view overlapping the second field of view in a second overlap region;
   a controller comprising a processor and a memory, the memory storing instructions that, when executed by the processor, cause the processor to:
      control the first camera and the second camera to capture, respectively, a first image and a second image of a first scene, the first scene comprising a first calibration target in the first overlap region;
compute a first relative pose between the first camera and the second camera based on the first calibration target in the first image and the first calibration target in the second image;
control the second camera and the third camera to capture, respectively, a third image and a fourth image of a second scene, the second scene comprising a second calibration target in the second overlap region;
compute a second relative pose between the second camera and the third camera based on the second calibration target in the third image and the second calibration target in the fourth image;
compute a third relative pose between the first camera and the third camera based on the first relative pose and the second relative pose; and
compute a first calibration of the first camera group based on the first relative pose, the second relative pose, and the third relative pose,
wherein each of the cameras comprises:
a first two-dimensional camera having a first optical axis; and
a second two-dimensional camera having a second optical axis substantially parallel to the first optical axis and having a field of view overlapping a field of view of the first two-dimensional camera.

2. The system of claim 1, wherein the first camera group further comprises a fourth camera having a fourth field of view overlapping the third field of view in a third overlap region, and
wherein the memory further stores instructions that, when executed by the processor, cause the processor to:
control the third camera and the fourth camera to capture, respectively, a fifth image and a sixth image of a third scene, the third scene comprising a third calibration target in the third overlap region; and
compute a fourth relative pose between the third camera and the fourth camera.

3. The system of claim 1, wherein the memory further stores a plurality of designed poses of the cameras of the first camera group, and
wherein the memory further stores instructions that, when executed by the processor, cause the processor to:
compute a plurality of differences between the designed poses and the first relative pose, the second relative pose, and the third relative pose; and
output the plurality of differences.

4. The system of claim 3, further comprising a graphical user interface displayed on a display device,
wherein the memory further stores instructions that, when executed by the processor, cause the processor to:
display, on the display device, an indication of the plurality of differences between the first relative pose, the second relative pose, and the third relative pose and the designed poses.

5. The system of claim 4, wherein the memory further stores instructions that, when executed by the processor, cause the processor to:
display, on the display device, a first confidence for the first relative pose, a second confidence for the second relative pose, and a third confidence for the third relative pose.

6. The system of claim 1, wherein the first calibration target comprises a backlit calibration target comprising a plurality of light emitting diodes configured to emit light through a calibration pattern.

7. The system of claim 1, wherein the second calibration target is the first calibration target after performing a rigid transformation.

8. The system of claim 7, wherein the first camera group is configured to image objects conveyed by a first portion of a conveyor system,
wherein the first calibration target is conveyed by the conveyor system, and
wherein the system further comprises:
a second camera group comprising a second plurality of cameras, the second camera group being configured to image objects conveyed by a second portion of the conveyor system;
a coordinating server configured to receive data captured by the first camera group and the second camera group, the coordinating server comprising a processor and a memory storing instructions that, when executed by the processor, cause the processor to:
control the first camera group to compute the first calibration, when the first calibration target is in the first portion of the conveyor system;
control the second camera group to compute a second calibration based on relative poses of the second plurality of cameras after the first calibration target is conveyed by the conveyor system to the second portion of the conveyor system; and
compute a calibration of the first camera group to the second camera group based on the first calibration and the second calibration.

9. A system for placing and calibrating cameras comprising a first camera group comprising:
a first camera having a first field of view;
a second camera having a second field of view overlapping the first field of view in a first overlap region;
a third camera having a third field of view overlapping the second field of view in a second overlap region;
a controller comprising a processor and a memory, the memory storing instructions that, when executed by the processor, cause the processor to:
control the first camera and the second camera to capture, respectively, a first image and a second image of a first scene, the first scene comprising a first calibration target in the first overlap region;
compute a first relative pose between the first camera and the second camera based on the first calibration target in the first image and the first calibration target in the second image;
control the second camera and the third camera to capture, respectively, a third image and a fourth image of a second scene, the second scene comprising a second calibration target in the second overlap region;
compute a second relative pose between the second camera and the third camera based on the second calibration target in the third image and the second calibration target in the fourth image;
compute a third relative pose between the first camera and the third camera based on the first relative pose and the second relative pose; and
compute a first calibration of the first camera group based on the first relative pose, the second relative pose, and the third relative pose, wherein the memory further stores a plurality of designed poses of the cameras of the first camera group,
wherein the memory further stores instructions that, when executed by the processor, cause the processor to:
compute a plurality of differences between the designed poses and the first relative pose, the second relative pose, and the third relative pose; and
output the plurality of differences,
wherein each of the cameras comprises one or more light emitting diodes, and
wherein the memory further stores instructions that, when executed by the processor, cause the processor to:
control the light emitting diodes of the cameras to indicate the plurality of differences between the first relative pose, the second relative pose, and the third relative pose and the designed poses.

10. The system of claim 9, wherein each of the cameras comprises:
a first two-dimensional camera having a first optical axis; and
a second two-dimensional camera having a second optical axis substantially parallel to the first optical axis and having a field of view overlapping a field of view of the first two-dimensional camera.

11. A method for placing and calibrating cameras of a first camera group, the method comprising:
controlling a first camera and a second camera of the first camera group to capture, respectively, a first image and a second image of a first scene,
the first camera having a first field of view,
the second camera having a second field of view overlapping the first field of view in a first overlap region;
the first scene comprising a first calibration target in the first overlap region;
computing a first relative pose between the first camera and the second camera based on the first calibration target in the first image and the first calibration target in the second image;
controlling the second camera and a third camera of the first camera group to capture, respectively, a third image and a fourth image of a second scene,
the third camera having a third field of view overlapping the second field of view in a second overlap region,
the second scene comprising a second calibration target in the second overlap region;
computing a second relative pose between the second camera and the third camera based on the second calibration target in the third image and the second calibration target in the fourth image;
computing a third relative pose between the first camera and the third camera based on the first relative pose and the second relative pose; and
computing a first calibration of the first camera group based on the first relative pose, the second relative pose, and the third relative pose,
wherein the second calibration target is the first calibration target after performing a rigid transformation.

12. The method of claim 11, wherein the first camera group further comprises a fourth camera having a fourth field of view overlapping the third field of view in a third overlap region, and
wherein the method further comprises:
controlling the third camera and the fourth camera to capture, respectively, a fifth image and a sixth image of a third scene, the third scene comprising a third calibration target in the third overlap region; and
computing a fourth relative pose between the third camera and the fourth camera.

13. The method of claim 11, further comprising
computing a plurality of differences between the first relative pose, the second relative pose, and the third relative pose and a plurality of designed poses of the cameras of the first camera group; and
output the plurality of differences.

14. The method of claim 13, wherein each of the cameras comprises one or more light emitting diodes, and
wherein the method further comprises:
controlling the light emitting diodes of the cameras to indicate the plurality of differences between the first relative pose, the second relative pose, and the third relative pose and the designed poses.

15. The method of claim 13, further comprising
displaying, on a graphical user interface displayed on a display device, an indication of the plurality of differences between the first relative pose, the second relative pose, and the third relative pose and the designed poses.

16. The method of claim 15, further comprising:
displaying, on the display device, a first confidence for the first relative pose, a second confidence for the second relative pose, and a third confidence for the third relative pose.

17. The method of claim 11, wherein each of the cameras comprises:
a first two-dimensional camera having a first optical axis; and
a second two-dimensional camera having a second optical axis substantially parallel to the first optical axis and having a field of view overlapping a field of view of the first two-dimensional camera.

18. The method of claim 11, wherein the first calibration target comprises a backlit calibration target comprising a plurality of light emitting diodes configured to emit light through a calibration pattern.

19. The method of claim 11, wherein the first camera group is configured to image objects conveyed by a first portion of a conveyor system,
wherein the first calibration target is conveyed by the conveyor system, and
wherein the method further comprises:
controlling the first camera group to compute the first calibration, when the first calibration target is in the first portion of the conveyor system;
controlling a second camera group comprising a second plurality of cameras to compute a second calibration based on relative poses of the second plurality of cameras after the first calibration target is conveyed by the conveyor system to a second portion of the conveyor system, the second camera group being configured to image objects conveyed by the second portion of the conveyor system; and
computing a calibration of the first camera group to the second camera group based on the first calibration and the second calibration.

* * * * *